(12) United States Patent
Graves et al.

(10) Patent No.: US 7,069,291 B2
(45) Date of Patent: Jun. 27, 2006

(54) SYSTEMS AND PROCESSES FOR CALL AND CALL FEATURE ADMINISTRATION ON A TELECOMMUNICATIONS NETWORK

(75) Inventors: Richard C. Graves, Nashville, TN (US); Song Liu, Richardson, TX (US); Hua Lin, Windham, NH (US)

(73) Assignee: CopperCom, Inc., Boca Raton, FL (US)

( * ) Notice: Subject to any disclaimer, the term of this patent is extended or adjusted under 35 U.S.C. 154(b) by 426 days.

(21) Appl. No.: 10/172,782

(22) Filed: Jun. 14, 2002

(65) Prior Publication Data

US 2003/0007621 A1    Jan. 9, 2003

Related U.S. Application Data

(63) Continuation of application No. 09/965,659, filed on Sep. 27, 2001, which is a continuation of application No. 09/735,288, filed on Nov. 21, 2000, which is a continuation of application No. 09/519,557, filed on Mar. 6, 2000.

(60) Provisional application No. 60/147,633, filed on Aug. 6, 1999, provisional application No. 60/142,250, filed on Jul. 2, 1999, provisional application No. 60/123,322, filed on Mar. 6, 1999.

(51) Int. Cl.
*G06F 15/16* (2006.01)

(52) U.S. Cl. .................... 709/201; 709/202; 709/217

(58) Field of Classification Search ............ 709/201, 709/202, 217
See application file for complete search history.

(56) References Cited

U.S. PATENT DOCUMENTS

| | | | |
|---|---|---|---|
| 4,656,624 A | 4/1987 | Collins et al. | 370/270 |
| 4,757,497 A | 7/1988 | Beierle et al. | 370/405 |
| 4,771,425 A | 9/1988 | Baran et al. | 370/458 |
| 4,872,158 A | 10/1989 | Richards | 370/380 |
| 4,872,159 A | 10/1989 | Hemmady et al. | 370/352 |

(Continued)

FOREIGN PATENT DOCUMENTS

EP    000789470 A2    8/1997

(Continued)

OTHER PUBLICATIONS

Grant Lenahan, Executive Director, NGN Solutions Bellcore, "Next Generation Networks—A Practical View of Network Evolution", pp. 1-10.

(Continued)

*Primary Examiner*—Ahmad F. Matar
*Assistant Examiner*—Quynh H. Nguyen
(74) *Attorney, Agent, or Firm*—David J. Powsner; Nutter McClennen & Fish LLP

(57) ABSTRACT

Improved systems and methods for call and call feature setup, administration and processing on PSTN and other telecommunications networks are provided. Calls are set up on a service plane of a conceptual switch that includes a switch plane, control plane, and service plane that are analogous to the OSI layered model of networks including a physical layer, network layer and application layer. Call set-up logic is separated from the switching fabric, allowing for flexible, on-demand, modification of service options using software while maintaining the same switching fabric in hardware. Call set-up is accomplished by a call request made upon connection of a call to the switch. This causes a call agent to search an eXtensible Markup Language knowledge base to find a web page corresponding to the initiating caller. The Web page may be collocated with the switch or on a LAN with the switch or on the "Web," even on the caller's termination equipment (telephone).

16 Claims, 28 Drawing Sheets

U.S. PATENT DOCUMENTS

| | | | |
|---|---|---|---|
| 4,872,160 A | 10/1989 | Hemmady et al. | 370/353 |
| 4,893,302 A | 1/1990 | Hemmady et al. | 370/427 |
| 4,899,333 A | 2/1990 | Roediger | 370/427 |
| 4,922,486 A | 5/1990 | Lidinsky et al. | 370/427 |
| 4,949,373 A | 8/1990 | Baker, Jr. et al. | 379/93.23 |
| 4,958,341 A | 9/1990 | Hemmady et al. | 370/352 |
| 4,977,556 A | 12/1990 | Noguchi | 370/400 |
| 5,282,244 A | 1/1994 | Fuller et al. | 379/230 |
| 5,329,619 A | 7/1994 | Page et al. | 709/203 |
| 5,341,374 A | 8/1994 | Lewen et al. | 370/450 |
| 5,384,840 A | 1/1995 | Blatchford et al. | 379/230 |
| 5,452,289 A | 9/1995 | Sharma et al. | 370/286 |
| 5,453,986 A | 9/1995 | Davis et al. | 370/259 |
| 5,463,629 A | 10/1995 | Ko | 370/463 |
| 5,535,204 A | 7/1996 | Li | 370/495 |
| 5,550,906 A | 8/1996 | Chau et al. | 379/201.05 |
| 5,553,063 A | 9/1996 | Dickson | 370/294 |
| 5,568,475 A | 10/1996 | Doshi et al. | 370/399 |
| 5,581,596 A | 12/1996 | Hogan | 455/435.1 |
| 5,583,872 A | 12/1996 | Albrecht et al. | 370/476 |
| 5,617,423 A | 4/1997 | Li et al. | 370/426 |
| 5,619,508 A | 4/1997 | Davis et al. | 370/495 |
| 5,623,488 A | 4/1997 | Svennevik et al. | 370/360 |
| 5,636,218 A | 6/1997 | Ishikawa et al. | 370/401 |
| 5,659,541 A | 8/1997 | Chan | 370/236 |
| 5,706,286 A | 1/1998 | Reiman et al. | 370/401 |
| 5,726,984 A | 3/1998 | Kubler et al. | 370/349 |
| 5,742,596 A | 4/1998 | Baratz et al. | 370/356 |
| 5,751,706 A | 5/1998 | Land et al. | 370/352 |
| 5,757,895 A | 5/1998 | Aridas et al. | 379/136 |
| 5,764,628 A | 6/1998 | Davis et al. | 370/271 |
| 5,764,750 A | 6/1998 | Chau et al. | 379/229 |
| 5,774,655 A | 6/1998 | Bloem et al. | 568/841 |
| 5,787,088 A | 7/1998 | Dagdeviren et al. | 370/493 |
| 5,799,317 A | 8/1998 | He et al. | 707/104.1 |
| 5,819,092 A | 10/1998 | Ferguson et al. | 717/113 |
| 5,822,420 A | 10/1998 | Bolon et al. | 379/230 |
| 5,841,840 A | 11/1998 | Smith et al. | 379/93.01 |
| 5,841,841 A | 11/1998 | Dodds et al. | 379/93.08 |
| 5,848,069 A | 12/1998 | Milne et al. | 370/426 |
| 5,860,068 A | 1/1999 | Cook | 705/26 |
| 5,862,134 A | 1/1999 | Deng | 370/352 |
| 5,881,060 A | 3/1999 | Morrow et al. | 370/337 |
| 5,889,845 A | 3/1999 | Staples et al. | 379/211.02 |
| 5,901,205 A | 5/1999 | Smith et al. | 379/93.01 |
| 5,944,783 A | 8/1999 | Nieten | 709/202 |
| 5,970,066 A | 10/1999 | Lowry et al. | 370/353 |
| 5,978,373 A | 11/1999 | Hoff et al. | 370/392 |
| 5,987,102 A | 11/1999 | Elliott et al. | 379/93.17 |
| 5,999,525 A | 12/1999 | Krishnaswamy et al. | 370/352 |
| 5,999,965 A | 12/1999 | Kelly | 709/202 |
| 6,003,084 A | 12/1999 | Green et al. | 709/277 |
| 6,009,469 A | 12/1999 | Mattaway et al. | 709/227 |
| 6,021,158 A | 2/2000 | Schurr et al. | 375/211 |
| 6,026,087 A | 2/2000 | Mirashrafi et al. | 370/389 |
| 6,029,203 A | 2/2000 | Bhatia et al. | 709/244 |
| 6,034,953 A | 3/2000 | Smith, Jr. | 370/359 |
| 6,058,104 A | 5/2000 | Snelling et al. | 370/277 |
| 6,061,392 A | 5/2000 | Bremer et al. | 375/222 |
| 6,069,879 A | 5/2000 | Chatter | 370/295 |
| 6,072,865 A | 6/2000 | Haber et al. | 379/211.02 |
| 6,075,784 A | 6/2000 | Frankel et al. | 370/356 |
| 6,081,591 A | 6/2000 | Skoog | 379/201.12 |
| 6,104,796 A | 8/2000 | Kasrai | 379/201.12 |
| 6,108,704 A | 8/2000 | Hutton et al. | 709/227 |
| 6,125,113 A | 9/2000 | Farris et al. | 370/389 |
| 6,131,162 A | 10/2000 | Yoshiura et al. | 713/176 |
| 6,134,446 A | 10/2000 | Sasuta et al. | 455/456.5 |
| 6,188,760 B1 | 2/2001 | Oran et al. | 379/230 |
| 6,229,803 B1 | 5/2001 | Bog et al. | 370/352 |
| 6,339,594 B1 * | 1/2002 | Civanlar et al. | 370/352 |
| 6,407,997 B1 | 6/2002 | DeNap et al. | 370/352 |
| 6,560,633 B1 * | 5/2003 | Roberts et al. | 709/202 |
| 6,724,747 B1 | 4/2004 | Arango et al. | 370/352 |
| 6,854,006 B1 * | 2/2005 | Giroir et al. | 709/203 |
| 2001/0028649 A1 | 10/2001 | Pogossiants et al. | 370/389 |

FOREIGN PATENT DOCUMENTS

| | | |
|---|---|---|
| JP | 402065498 A | 3/1990 |
| JP | 404324734 A | 11/1992 |
| JP | 406105384 A | 4/1994 |
| JP | 406338887 A | 12/1994 |
| JP | 407307789 A | 11/1995 |
| JP | 408111692 A | 4/1996 |
| JP | 408274812 A | 10/1996 |
| JP | 409214484 A | 8/1997 |
| JP | 409247214 A | 9/1997 |
| JP | 410051453 A | 2/1998 |
| JP | 410126819 A | 5/1998 |
| WO | WO 97/23078 | 6/1997 |
| WO | WO 97/27692 | 7/1997 |
| WO | WO 98/118235 | 4/1998 |
| WO | WO 98/20701 | 5/1998 |
| WO | WO 99/34612 | 7/1999 |

OTHER PUBLICATIONS

Mauricio Arango et al., Internet Engineering Task Force, "Media Gateway Control Protocol—(MGCP)" Nov. 9, 1998, pp. 1-88, (internet draft, version 0.1 draft, expires May 9, 1999.

IntelliSwitch, "Benefits of the Intelliswitch Gateway vs. Router Based Products", Jun. 21, 1999 [internet] www.intelliswitch/com/frame.htm?pg=200.

Internet Engineering Task Force, "CPL: A Language for User Control of Internet Telephone Services" [internet draft, expires Sep. 1999] pp. 1-21.

Paula Bernier, "Telephone Switch Vendors Target Internet", www.zdnet.com/intweek/diaily/960627b.htm.

Kathleen Cholewka, "Smart Networks Gain A Platform", Inter@active week, Jul. 26, 1999, www.zdnet.com/intweek/stories/news.

"A Network View of Service Agent and CAML Servers and their relationship with other network components".

KMJ Communications Radius, "Remote Authentication Dial-In User Service" Remote Network Access Security in an Open Systems Environment, Jun. 21, 1999, www.kmj.com/radius.html.

Press Release, "Level 3 Communications, Bellcore Announce Merger of Protocol Specifications for Voice Over Ip", Nov. 16, 1998, www. bellcore.com/newsroom/pressreleases/.

"Call-agent software: Another Step to Next-Generation Networks", Exchange Magazine—winter 1999 www.bellcore.com/newsroom/knowledgebase/.

"Knowledge Base" www.bellcore.com:8822/query.html?bhu=.

Christian Huitema, Internet Architecture Research Laboratory, "Who We Are", www.bellcore.com/research/whoware/staff/.

"Our Latest Thinking", www.bellcore.com/research/thinking.html.

Internet Engineering Task Force, "Call Processing Language Framework and Requirements," Internet Draft, Columbia University, Oct. 22, 1999, 18 pp.

Telephony and data networks, Internet for Business (4 pp.) Mar. 1, 1997.

*Homeworx Dual Tech System for Circuit-Switched and IP Telephony*, ADC Telecommunications, Inc., 6 pp. (1998).

Search results for articles about Vienna Systems and voice, or data or integrat, 36pp. (1997, 1998).
William Stallings, Ph.D., Data and Computer Communications, Chapter 14, Internetworking, 33 pp.
Search results for articles about Vina/100 bundle, 52pp. (1997, 1998).
AG Communications Systems, "Infrastructure for DSL Solutions - AGCS," by Mark Emery, printed from agcs.com/techpapers/dsl—inf.htm, pp 1-6 (Sep. 13, 2000).
Search results for articles about Homeworx access platform and ADC, 10pp. (1995-1996).
Profiling the Current Market, Telecommunications Americas Edition, vol. 32, 5 pp. (Oct. 1998).
RHCs Handle IP the Vienna Way, internetTelephony News Of The Week, 2pp. (Sep. 3, 1996).
Telephony over IP Statement of Work, "ANA Project Completion Report on CA Phonell: Telephony over IP," printed from enfm..utcc.utoronto.ca/c2/voip/Final-Report.html, pp. 1-7.
Vienna.way: Doing it Your Way, PC Magazine Online, 4pp. (Oct. 21, 1997).
Asymmetric Digital Subscriber Line, Alcatel 1000 ADSL, 1 p. (Sep. 13, 2000).
PowerVoice Illustration, 1p, Apr. 1997.
26 of 150 Documents, PR Newswire Association, Inc., "ADC Receives Contract to Develop Cable Telephony Network for Scandinavian Service Provider Netcom, " 2 pp. (Oct. 20, 1997).
Table of Contents, Cisco Systems Users Magazine, 36pp. (1997).
NetSpeak Corporation to Exhibit First Release of Voice over IP, IP-to-PSTN Networking Products, NetSpeak Corporation Press Release. 3 pp. (Sep. 25, 2000).
V/IP: Phone/Fax IP Gateway, The Micom V/IP Phone/Fax IP Gateway, http:www3.norteinetworks.com/product/vip/together.html, 4pp. (Sep. 18, 2000).
Micom sends Voice over IP net., Business Communications Review, vol. 26, pp. 22-23 (Dec. 1, 1996).
V/IP: Phone/Fax IP Gateway, Applications Guide: Complete Voice and Fax Integration Over IP Networks, http:www3.norteinetworks.com/product/vip/cov.html, 2pp. (Sep. 18, 2000).
Micom V/IP gateway saves TexasBank 42,200 per month; Article May 6, 1997.
V/IP: Phone/Fax IP Gateway, Putting It All Together, http:www3.norteinetworks.com/product/vip/together.html, 6pp. (Sep. 18, 2000).
Voice-over-DSL patent battle looming?, Network World Fusion, 3 pp. (Sep. 3, 2000).
Micom, V/IP Phone/Fax IP Gateway, Voice Interface Cards and PC Software, 6pp.
MICOM showcases new V/IP phone/fax IP gateway at Internet World, 2 pp. (Dec. 11, 1996).
Thompson, George A., Micom Communications Corp, Corporate Profile, Digital Age, v16, n6, p7(1), 3pp. (Jun. 1997).
VINA Technologies, M2 Presswire, 4 pp. (Jul. 15, 1998).
Nortel Networks, Media Center: News and Events, 2pp.
David P. Koester, "Fiber Distributed Digital Interface (FDDI)," 1 p. (Oct. 22, 1995).
Micom, Integrated Networking: Voice and Fax Share LAN/WAN Connections, 16pp. (1995).
Description of CopperCom, Inc. , Chapter 1, Introduction, through Chapter 9, Financial Projections, 37 pp.
Micom: Marathon Data/Voice WAN Solutions, Applications Guide, 56pp. (1997).

Computer Telephony, vol. 5, Issue 4, 3 pp. (Apr. 1997).
Short, Kristin Illene, "Towards integrated Intranet Services: Modeling the Costs of Corporate IP Telephony", Massachusetts Institute of Technology, 80pp. (Sep. 1997).
Sears, Andrew Lester, "Directory Services for Internet telephony: Creating a Spanning Layer Over the Internet and Telephone Networks", Massachusetts Institute of Technology, 39pps. (Aug. 8, 2000).
Reference: Rulemaking 8775 - ACTA Petition on Internet Telephony - ACTA Petition on Internet Telephony before the Federal Communications Commission, 15pp. (Oct. 11, 2005).
"Fast & Furious," MICOM Communications Corp., 1 p. (May 15, 1997).
Press Release: CLECS and Service Providers Line Up Behind VINA Technologies' T1Integrator, 3 pp. (May 5, 1998).
Nortel Networks, Products Documentation Webpage, 2pp.
Powerpoint Presentation to MCI, Reducing the Cost of Network Access, 28 pp. (Dec. 9, 1997).
Cisco Introduces First Internetworking Routers with Built-In DSR/CSU Telecommunications Functinality, printed from ieng.com/warp/public/146/pressroom/1996/Mar96, 2 pp. (Sep. 06, 2000).
CooperCom, Creating Voice Services Over Broadband, 19 pp. (Sep. 2, 2000).
V/IP: Phone/Fax IP Gateway, V/IP Applications, http:www3.nortelnetworks.com/product/vip/application.htlm, 3pp. (Sep. 18, 2000).
Corporate Fact Sheet, CopperCom —Company Info, 3 pp. (Sep. 2, 2000).
Kenneth Guy, Business Landscape, "Save as you speak, " *The Daily Yomiuri*, 5 pp. (Feb. 19, 1997).
T. Kent Elliott, powerpoint presentation: The Effect of Internet Telephony on Business, 39 pp.
Micom, V/IP Voice Gateway, PC Magazine Online, 3pp. (Oct. 21, 1997).
Zooming toward 2000, Special Report: China; ISSN: 1067-6317, 5 pp. (Nov. 1996).
John Peters, "Voice on the Net, Commercialization of Internet Telephony, " Powerpoint presentation, 20 pp.
Complete Voice and Fax Integration Over IP Networks, VIP Phone/Fax IP Gateway, 8 pp.
Inter-Tel Illustration from Apr. 1997, 1p.
Computer Telephony, Vol. 4, issue 9, 5 pp. (Dec. 1996).
Joe Rinde, "Telephony in the Year 2003, " MCI, Powerpoint presentation, 20 pp. (Mar. 31, 1998).
IAC (SM) Newsletter Database (TM), Broadband: ADC Creates Broadband Communications Division,: printed from Lexis-Nexis, pp. 3-5 (Aug. 26, 1996).
Micom Netrunner 75E, Integration Router, 4 pp. (Sep. 20, 2000).
122 Computer Telephony, Best of Show, "UNPBXs Becoming the Rage" (Apr. 1997).
Mishra, et al., "A Hop by Hop Rate-based Congestion Control Scheme, " pp. 112-123 (1992).
Steve Craddock, "Advancing IP Telephony with Residential Broadband," Spring '98 VON Conference Powerpoint presentation, 17 pp. (Apr. 1, 1998).
Chris Fair, et al., "Strategic Report Regarding The Deployment of ATM Within NCAR/UCAR," National Center for Atmospheric Research, 25 pp. (Sep. 03, 2002).
Computer Telephony, vol. 4, Issue 12, 3 pp. (Sep. 1996).

Network Media —IP/PSTN Gateway, printed from networkingmedia.demon.co.uk/content/vienna.html, 5 pp. (Sep. 02, 2000).

Metropolitian-area Networks, IEEE Spectrum, pp. 40-42 (May 1990).

Jeffre R. Shapiro, Computer Telephone Strategies, Chapter 12: CT and the Cyberspace Phenominon, 8 pp.

Storage Admin (Windows & .NET Magazine Network), NY News Network, 9 pp. (Sep. 3, 2002).

PC Magazine: Divide and Conquer, "Now your company can communicate like the big guys. A sub- T1 leased line —plus a low-end multiplexer —boosts connections," 1 p., (Feb. 6, 1996).

Applications Guide, Complete Voice and Fax Integration Over IP Networks, V/IP Phone/Fax IP Gateway, 15 pp. (Sep. 10, 2000).

Lexis-Nexis printout: T1: CLECS and Service Providers line Up Behind VINA Technologies'T1 Integrator, 3 pp. (May 11, 1998).

Lexis-Nexis printout: More on VINA's T1 Integrator For Voice, Data, 2 pp. (Jun. 3, 1997).

ISDN Overview, Chap. 4, p. 102 and Part II: Computer Telephony Services, p. 248.

Micom Press, Welcome to Micom's Press Release Page, 4pp.

Micom News Release, Voice/IP Gateway to Inteoperate with Microsoft NetMeeting 2.0 for OffNet Calling, 2 pp. (Apr. 28, 1997).

V/IP: Phone/Fax IP Gateway, How V/IP Works, http:www3.nortelnetworks.com/product/vip/html, 4pp. (Sep. 18, 2000).

Enhancing LAN/WAN Networks, "Integrating Data Voice Fax Lan," by Kenneth R. Guy, Vice President, Marketing and Corporate Strategy, MICOM Communications Group, 20 pp.

Voice Across the Internet, PC Magazine Online, 2 pp. (Oct. 21, 1997).

Search results for articles about Homeworx and Voice and ADC, 25 pp. (1996, 1997).

Search results for articles about Vienna Systems and Voice, Video or LAN, 18pp. (1996, 1997).

Lucent Technologies Press Release, "Lucent Technolgies and VINA Technologies to integrate voice and data onto single line, reducing network costs," 2 pp. (Jun. 02, 1998).

Remote Terminal Server for Marathon Integration Products, 2 pp.

FOCUS —88 of 89 Stories, Buisness Wire, Inc., 6 pp., Mar. 5, 1996, Wednesday.

David D. Bezar, "LAN times Guide to Telephony, " 3 pp.

ADC Telecommunications, Homeworx ™is HFComplete: A Lifeline White Paper, 4 pp., printed from bbg.adc.com/Education/HFC/stories/lifeline/index.html (Sep. 13, 2000).

Table of Contents, Cisco Systems Users Magazine, pp. 1-37 (Sep. 10, 2000).

Lexis-Nexis printout: Workgroup router: NetRunner Integration Router; Micom; 1996 Products of the Year; Product InformationBrief Article, vol. 11, 28 pp. (Sep. 20, 2000).

CopperCom's Integrated Access System for Residences, Small Office Home Offices, and Small Businesses, Requirements Document, Version 1.0, 33 pp. (Oct. 27, 1997).

ADC Telecommunications-Annual Report, "To our Shareholders," printed from media.corporate-ir.net/media...adct/adct$_{13}$980909$_{13}$200$_{13}$100/letter.html, pp. 1-3 (sep. 13, 2000).

Nortel Networks, Products V/IP webpage, 2pp.

Paradyne Press Release, Paradyne and e-Net Join Forces to Deliver Low-Cost, High-Speed High-Fidelity DSL-Supercharged Data Telephony, 4pp. (Jun. 9, 1997)).

Search results for articcles about Alcatel and Pots Splitter, 26pp. (1998).

"ADC Introduces HomeworxT Forward Path Receiver for Hub and Office Envirnoments," Press Release printed from stele.adc.com, 1 p. (Sep. 13, 2000).

Yang, et al., "A Taxonomy for Congestion Control Algorithms in Packet Switching Networks," *IEEE Network Magazine*, vol. 9, 16 pp., Jul./Aug. 1995.

Micom Surpasses 1,200 Voice/IP Gateway - vol. 9, pp. 6-7 (Apr. 1997).

Dialog printout, No. 131., 29/9/131 (Item 114 from file 275), pp. 56-58 (Aug. 1, 2000).

ADC Telecommunications, Inc., "High-Performance Homeworx ™1550nm Optical Headend Platform Increases Capabilities for Distribution and Supertrunking,"1 p. (Jun. 4, 1997).

V/IP Phone/Fax IP Gateway, Analog Models NetWare and DOS User's Manual, 232pp. (Sep. 1997).

"ADC Provides Homeworx™Telephony System to Nanjing CATV," printed from stele.adc.com, 1 p. (Sep. 13, 2000).

Final Network Status Report, LEARN-ED Deliverable 12, 22 pp. (Mar. 10, 1997).

*IBM Nways ATM Solutions Fact Sheet*, "Award-winning, industry-leading, low-cost, end-to-end ATM solutions," pp. 1-15 (Mar. 11, 1997).

"Dual Path Receiver Added to ADC's Line of Homeworx ™AM Transmission Products," printed from stele.adc.com, 1 p. (Sep. 13, 2000).

Micom, Cell Relay for SUB T1/E1 Networks, Overview: Data, Voice, Fax and LAN Integration, 19pp. (1995).

Bamdwidth Management Technologies, An Introduction to Micom's Frame Relay, Cell Relay and Fast Packet Technologies, Part 1: MicroBand ATM Cell Relay, 31 pp.

* cited by examiner

```xml
<?xml version="1.0" standalone="yes"?>
<!DOCTYPE profile SYSTEM "CAML.dtd" [
<!-- Description: This customer subscribes the following services:
....1. Forward call to 412-455-3456 on Monday
....2. Security screening
Author: Unknown
-->
]>
<profile>
  <profileIdentifier>
    <person>
       <cdn logic="Pos">954-247-4000</cdn>
    </person>
  <profileIdentifier>
  <case>
      <!--redirect the call to 412-455-3456 on Monday -->
      <task><redirect>412-445-3456</redirect></task>
      <condition logic="And">
         <time> <week logic="Pos">Monday</week></time>
      </condition>
  </case>
  <case>
     <!-- Collect PIN for security screening -->
     <task>
        <prompt promptType="voice">Please enter your Personal Identification Number now</prompt>
        <collect name="PIN" type="length">14</collect>
     </task>
     <condition>
        <person> <PIN length="14">none</PIN> </person>
     </condition>
  </case>
  <case>
       <task><routing>954-247-4000</routing> </task>
       <condition>
          <person logic="Or">
            <PIN length="14">42355564588000</PIN>
            <PIN length="14">42355564588001</PIN>
            <PIN length="14">4235556458802</PIN>
            <PIN length="14">4235556458803</PIN>
          </person>
       </condition>
   </case>
</profile>
```

Fig. 10

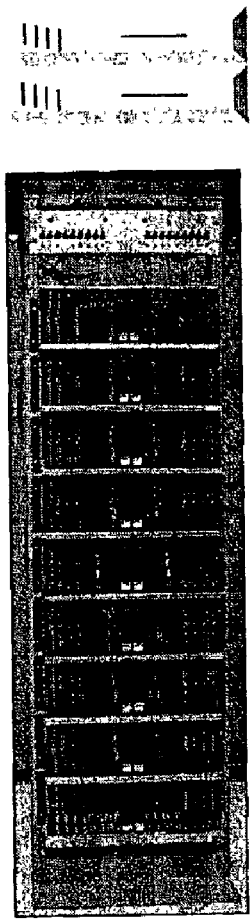
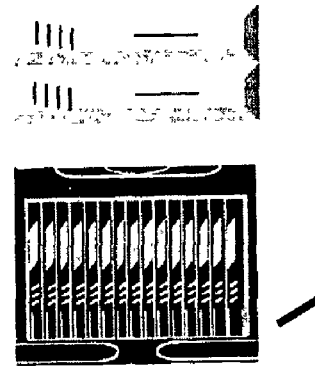
*Telecommunication Services Portal*
200
250
Fig. 13
Fig. 12

```
<?xml version="1.0"?>
<!DOCTYPE profile SYSTEM "cpml.dtd" []>
<profile>
    <para>test: originating policy</para>
    <case>
        <schedule cLogic="or">
            <period start="*T08:00" End="*T18:00"/>
        </schedule>
        <scenario cLogic="or">
            <info lookup="value://900" callInfo="cdnArea"/>
            <info lookup="value://international" callInfo="destType"/>
        </scenario>
        <release target="local://release" reMethod="anncl" actDir="finished"/>
    </case>
</profile>
```

Fig. 15

```
<?xml version="1.0"?>
<!DOCTYPE profile SYSTEM "cpml.dtd" []>
<profile>
    <para>test: originating policy</para>
    <case name="IntlCall">
        <scenario unitLogic="or">
            <info lookup="value://international" callInfo="destType"/>
        </scenario>
        <release target="local://release" reMethod="anncl" actDir="finished"/>
    </case>
</profile>
```

Fig. 16

```
<?xml version="1.0"?>
<!DOCTYPE profile SYSTEM "cpml.dtd" []>
<profile>
   <para>test: originating policy</para>
   <case name="IntlCall">
        <schedule unitLogic="or">
           <period start="*T08:00" end="*T18:00"/>
        </schedule>
        <scenario unitLogic="or">
           <info lookup="value://international" callInfo="destType"/>
        </scenario>
        <release target="local://release" reMethod="cancl" actDir="finished"/>
   </case>
</profile>
```

Fig. 17

```xml
<?xml version="1.0"?>
<!DOCTYPE profile SYSTEM "cpml.dtd" []>
<profile>
    <para>test: originating policy</para>
    <case name="localFree">
        <scenario unitLogic="or">
            <info lookup="value://localFree" callInfo="destType"/>
        </scenario>
        <route target="local://route" roMethod="digits"/>
    </case>
    <case name="intraLATATollCall">
        <scenario unitLogic="or">
            <info lookup="value://intraLATAToll" callInfo="destType"/>
        </scenario>
        <route target="local://route" roMethod="CIC" cic="0288"/>
    </case>
    <case name="interLATATollCall">
        <scenario unitLogic="or">
            <info lookup="value://interLATAToll" callInfo="destType"/>
        </scenario>
        <route target="local://route" roMethod="CIC" cic="0222"/>
    </case>
    <case name="IntlCall">
        <schedule unitLogic="or">
            <period start="*T08:00" end="*T18:00"/>
        </schedule>
        <scenario unitLogic="or">
            <info lookup="value://international" callInfo="destType"/>
        </scenario>
        <release target="local://release" reMethod="anncl" actDir="finished"/>
    </case>
</profile>
```

Fig. 18

```
(1) <info lookup="value://901" callInfo="cdrArea"/>

(2) <info lookup="value://interLATACall" callInfo="destType"/>

(3) <info lookup="value://" callInfo="cpn"/>

(4) <info lookup="LDAP://pindigits" callInfo="pin"/>

(5) <info lookup="LDAP://pindigits" callInfo="pin"/>

(6) <info lookup="http://www.Myhost.com/servlet/MySpecialTest" callInfo="pin"/>
```

Fig. 19

| Call Parameter | Value | Description |
|---|---|---|
| callType | VOICE, DATA, MODEM | |
| CCC | 3-, 4-digit code | Country code |
| CIC | 3-, 4-digit code | Carrier identification code |
| CDN | Up to 24 digits | Called party number, presented as NPA-NXX-XXXX such as 901-247-1600 |
| cdaArea | 3-digit | The area code. The NPA of NPA-NXX-XXXX. |
| cdnOffice | 3-digit | The NXX part of the phone number |
| cn | 10-digit | The charge party number |
| code | Up 24-digit | DTMF digits string, it could be PIN, |

Fig. 20

| | | authorization code, authentication code. |
|---|---|---|
| country | string | The name of the country such as USA, French |
| cpnArea | 3-digit | The NPA of the calling party number |
| cpnOffice | 3-digit | The NXX of the calling party number |
| DestType | | |
| DigitsType | | |
| IIDigits | 1-, 2-digit | The original line type |
| newDest | 10-digit | The new destination number, used in Call Forwarding |
| origDest | 10-digit | The original destination number |
| OZZ | 2-digit | When a call is routed by CO through AT to IXC, this digits indicates the trunk group between the AT and IXC. |
| PIN | Digits | |
| RN | 10-digit | Redirect number |
| trunkGroup | 6-digit | Trunk group ID |
| | | |

Fig. 21

```
<?xml version="1.0"?>
<!DOCTYPE profile SYSTEM "cpml.dtd" []>
<profile>
    <para>test: originating policy</para>
    <case name="localFree">
        <scenario Logic="or">
            <info lookup="value://901" callInfo="cdrArea"/>
            <info lookup="value://617" callInfo="cdrArea"/>
            <info lookup="value://954247" callInfo="cdrArea"/>
        </scenario>
        <release target="local://release" reMethod="annc2" actDir="finished"/>
    </case>
</profile>
```

Fig. 22

```
<?xml version="1.0"?>
<!DOCTYPE profile SYSTEM "cpml.dtd" []>
<profile>
    <para>test: originating policy</para>
    <case name="localFree">
        <scenario Logic="or">
            <info lookup="value://901" callInfo="cdrAreadestType"/>
            <info lookup="value://617" callInfo="cdrArea"/>
            <info lookup="value://954247" callInfo="cdrOffice"/>
        </scenario>
        <schedule Logic="or">
            <period start=Sat/>
            <period start=Sun/>
        </schedule>
        <release target="local://release" reMethod="annc2" actDir="finished"/>
    </case>
</profile>
```

Fig. 23

```
<?xml version="1.0"?>
<!DOCTYPE profile SYSTEM "cpml.dtd" []>
<profile>
    <para>test: originating policy</para>
    <case name="localFree">
        <scenario Logic="or">
            <info lookup="value://901" callInfo="cdrArea"/>
            <info lookup="value://617" callInfo="cdrArea"/>
            <info lookup="value://954247" callInfo="cdrOffice"/>
        </scenario>
        <schedule Logic="and">
            <period start=Sat unitLogic="not"/>
            <period start=Sun unitLogic="not"/>
        </schedule>
        <release target="local://release" reMethod="annc2" actDir="finished"/>
    </case>
</profile>
```

Fig. 24

```
<?xml version="1.0"?>
<!DOCTYPE profile SYSTEM "cpml.dtd" []>
<profile>
    <para>test: originating policy</para>
    <case name="localFree">
        <scenario Logic="or">
            <info lookup="value://901" callInfo="cdrArea"/>
            <info lookup="value://617" callInfo="cdrArea"/>
            <info lookup="value://954247" callInfo="cdrOffice"/>
        </scenario>
        <schedule Logic="or">
            <period start="Mon"/>
            <period start="Tue"/>
            <period start="Wed"/>
            <period start="Thu"/>
            <period start="Fri"/>
        </schedule>
        <release target="local://release" reMethod="annc2" actDir="finished"/>
    </case>
</profile>
```

Fig. 25

(1) <route target = "route" roMethod = "cdrArea"/>

(2) <link target = "http://www.MyHost.com/servlet/MySpecialTask"/>

Fig. 26

```
<?xml version="1.0"?>
<!DOCTYPE profile SYSTEM "cpml.dtd" []>
<profile>
   <para>test: originating policy</para>
   <case name="localFree">
      <scenario unitLogic="or">
         <info lookup="value://" callInfo="PIN" unitLogic = "not"/>
      </scenario>
      <collect target="sw1" prePrompt = "annc3" type = "PIN"
         numOfDigits = "12"/>
   </case>
   <case name="intraLATATollCall">
      <scenario unitLogic="and">
         <info lookup="value://412233000123" callInfo="PIN"/>
         <scenario unitLogic="or">
            <info lookup = "value://intraLATAToll" callInfo="destType"/>
            <info lookup = "value://intrerLATAToll" callInfo="destType"/>
         </scenario>
      </scenario>
      <route target="local://route" roMethod="CIC" cic="0288"/>
   </case>
</profile>
```

Fig. 27

SYSTEMS AND PROCESSES FOR CALL AND CALL FEATURE ADMINISTRATION ON A TELECOMMUNICATIONS NETWORK

CROSS-REFERENCE TO RELATED APPLICATIONS

This application is a continuation of same-titled U.S. patent application Ser. No. 09/965,659, filed Sep. 27, 2001, which is a continuation of same-titled U.S. patent application Ser. No. 09/735,288, filed Nov. 21, 2000, which is a continuation of same-titled U.S. patent application Ser. No. 09/519,557, filed Mar. 6, 2000, which claims the benefit of priority of U.S. patent application Ser. Nos. 60/123,322 (filed Mar. 6, 1999 for SYSTEM AND PROCESS FOR SERVICE PLANE CALL SET-UP FOR TELEPHONY NETWORKS), 60/142,250 (filed Jul. 2, 1999 for SYSTEM AND PROCESS FOR EXTENSIBLE TELEPHONY SERVICE POLICY) and 60/147,633 (filed Aug. 6, 1999 for SYSTEM AND PROCESS FOR SERVICE PLANE CALL HANDLING FOR TELEPHONY NETWORKS).

BACKGROUND OF THE INVENTION

The invention pertains to telephony and, more particularly, to systems and processes for call and call feature setup, administration and processing on public switched telephone networks (PSTN) and other telecommunications networks.

Voice telephony (and data communication via telephone modem) today is conducted primarily by "copper loops" or wireless transmission (via base station) from the user or subscriber to a central office (Class 4) switch that initiates the process of connecting the call to its ultimate destination, whether in the same local exchange handled by the central office, or to a remote central office. The call set-up process involves a series of "trigger points" wherein the service options available to the caller are checked against a database that is periodically downloaded to the switch from the local carrier's database (typically relational, i.e., table-based). At the central office switch of the receiving subscriber, a similar sequence is followed to check such service options as call waiting or call forwarding. Updates of the databases are cumbersome, and adding new services requires additional programming and trigger points in an already complex code.

The process of call set up outside the local service area further requires an "out of band" communication over the SS7 ("Signaling System 7) network and protocols distinct from the network over which voice traffic flows. It is this system that allows the proper switching of traffic for roaming cellular subscribers and for 800- and 900-numbers. It also provides caller identification. The system, however, is limited in its bandwidth and by the small number of knowledgeable programmers.

The prior art has made advances in the middle or "control" layer of a three-layer network model for voice telephony as part of a trend towards "Advanced Intelligent Networks" ("AIN"). These advances have involved call agents using the SS7 network to control new functionality in call set up and the upgrading of the International Telecommunications Union H.323 Internet protocol for coordination of voice, data, and video traffic on the Public Switched Telephone Network (PSTN). For example, Bellcore and Cisco developed the Simple Gateway Control Protocol (SGCP) to improve on H.323 and Level 3 developed the Internet Protocol Device Control (IPDC). The Media Gateway Control Protocol (MGCP) is a merger of SGCP and IPDC sponsored by the Internet Engineering Task Force to migrate SS7 functions into Internet Protocol (IP).

The current state of the art remains one of limited service options. Any change in service requires the reloading of service maps stored in relational data bases; each new variable for service requires another table, essentially another dimension in the relational database. Each variable is implemented at a stop point in switching fabric. Switches still require complex programming and cost in the millions of dollars.

It is an object of the present invention to provide improved systems and methods for call and call feature setup, administration and processing.

SUMMARY OF THE INVENTION

The foregoing are among the objects attained by the invention, which provides improved systems and methods for call and call feature setup, administration and processing on PSTN and other telecommunications networks.

According to aspects of the invention, calls are set up on a service plane of a conceptual switch that includes a switch plane, control plane, and service plane that are analogous to the OSI layered model of networks, which includes a physical layer, network layer and application layer. Call set-up logic is separated from the switching fabric, allowing for flexible, on-demand modification of service options using software, while maintaining the same switching fabric in hardware.

In related aspects of the invention, call set-up is accomplished by a call request made upon connection of a call to the switch. This causes a call agent to search an eXtensible Markup Language knowledge base to find a Web page corresponding to the initiating caller. The Web page may be collocated with the switch or on a LAN with the switch or on the "Web," even on the caller's termination equipment (telephone). The Web pages may be modified easily and flexibly. The control of call set-up using Internet search techniques results in a highly flexible system of telephony that can be characterized as "Voice Under IP."™

In further and related aspects, the invention provides a network architecture referred to herein as Extensible Service Policy Architecture (ESPA) for delivering telephony and other services utilizing web-based service logic and IP message distribution for signaling. ESPA divides the functions of call processing into manageable layers. At the top layer, it provides a platform that unifies service definition across multiple systems and protocols.

ESPA provides a bridge between the IP-based information community and the SS7-based PSTN, thus opening the PSTN to a wealth of new services driven by IP. By combining IP/web-based technology like LDAP (Lightweight Directory Access Protocol), web search engines, JAVA, CORBA, and/or Call Policy Markup Language or CPML (discussed below) with traditional telecommunications technology such as SS7 and TCAP, aspects of the invention achieve a service network whereby web-based applications and customers can reach the information resource and customers of the PSTN and visa versa.

ESPA provides the environment to integrate services supported by prior art systems, through AIN/IN and services supported through CTI (Computer Telephony Interface). In doing so, ESPA simplifies the network configuration and management. Moreover, by using proven and open standard technology and using web pages to house service logic, ESPA gains the advantage of speeding the time-to-market for new services and applications.

Due to the mobility of web pages (because of search engine), and due to the accessibility of web page (because of http), ESPA puts the control of features and service into the hands of customer and service providers instead of vendors. It gives to customers new services in a controllable environment and to service providers the tools to differentiate themselves from others.

Further and related aspects of the invention provide a client/server architecture in which a switch performs as a client responsible for collecting call information, monitoring caller activities, and performing basic call process. As a server, an IP based network is responsible for creating and maintaining service information (the logic and the data) as well as providing the service information to switches upon request.

Yet still further and related aspects of the invention provide for the use of XML-based script language to define call processing and services.

Systems according to still yet further and related aspects of the invention permit the creation, maintenance and provision of service logic and related data through a distributed architecture at least in part separate from switches. Such systems can be implemented utilizing the web technologies, such that Instead of containing and executing service logic and data, a switch performs as an client, collecting information, sending request to server, and processing the response Instead of SS7, HTTP is used for information communication between switch (client) and server that containing the service information Instead of using legacy database and the hard-coded software with proprietary API (Application Programming Interface), XML script language and the parser is used as the mechanism for feature creation Instead of using rigid and complicated relationship among data, URL and search engine is used for organizing information.

These and other aspects of the invention, as well as advantages thereof, are evident in the drawings and in the detailed description that follows.

BRIEF DESCRIPTION OF THE DRAWINGS

A more complete understanding of the invention may be attained by reference to the drawings, in which:

FIG. 10 is an example of a Web page according to the invention containing call handling data in XML format;
FIG. 12 is a front view of a first switch having the Extensible Service Policy Architecture of FIG. 11;
FIG. 13 is a front view of a second switch having the extensible service policy architecture of FIG. 11; and,
FIG. 14 is a second block diagram of the extensible service policy architecture of FIG. 11 having more detail and including logical planes.
FIG. 15 is a code sample in a markup language, CPML, according to the invention;
FIG. 16 is a second code sample in CPML, in this case a "CASE", according to the invention;
FIG. 17 is a third code sample with a second CASE according to the invention;
FIG. 18 is a fourth code sample with a plurality of cases according to the invention;
FIG. 19 is a fifth code sample demonstrating a checking function according to the invention;
FIG. 20 is a sixth code sample demonstrating a second checking function according to the invention;
FIG. 21 is a seventh code sample demonstrating a third checking function according to the invention;
FIG. 22 is an eighth code sample showing a partial call originating policy according to the invention;
FIG. 23 is a ninth code sample according to the invention;
FIG. 24 is a tenth code sample demonstrating negative logic according to principles of the present invention;
FIG. 25 is an eleventh code sample showing the sample of FIG. 24 without negative logic;
FIG. 26 is a twelfth code sample showing the linking of an external servlet according to principles of the present invention;
FIG. 27 is a thirteenth code sample wherein a 12-digit PIN is collected through entity "sw1.

DETAILED DESCRIPTION OF THE ILLUSTRATED EMBODIMENT

Figure 1:
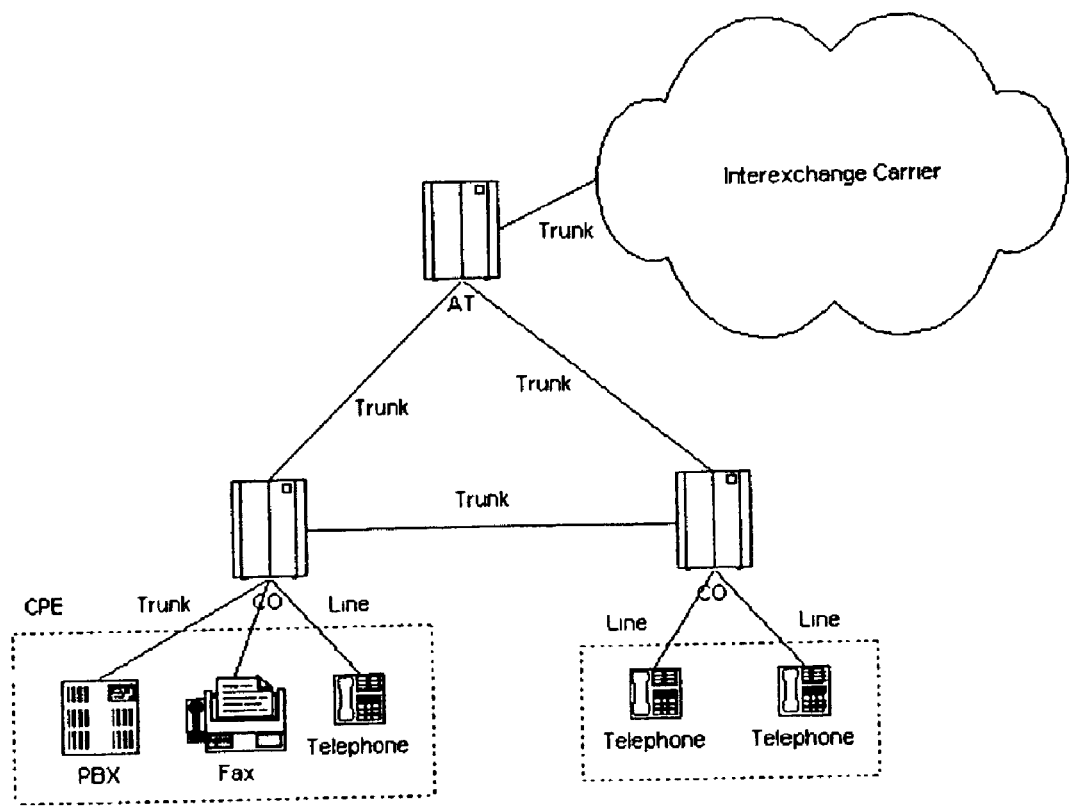
FIG. 1 is a block diagram of a typical telephone network.

Subscriber features in telephone network are created to provide telephone users with varieties of services in terms of pricing, quality of service, security, performance, accessibility, information sharing, and etc. Several examples are listed below to illustrate subscriber features.

Multi-PIC dialing—It relates to network accessibility. It allows a caller to pre-subscribe telephone services with several service providers. For instance, a caller may want to use service provider A for local toll calls, use provider B for domestic long distance toll calls, and provider C for international calls.

Call restriction—It relates to network accessibility and security. It restricts originating calls to a set of pre-defined areas, 901-XXX-XXXX for example.

Authorization calling—It is a security feature. It allows caller to originate a call with the verification of the authorization code (or personal identification number).

Call acceptance—It allows the subscriber to define a set of conditions under which a terminated call should be accepted. For instance, it may allows a subscriber to choose the time during which he wants to accept a terminating call to his phone line. The time schedule could base on time of day, day of week. The rules for call acceptance could base even on the originating location information (calls from his Boss and from his Mom).

Over the decades, a large number of subscriber features have been implemented in the telephone network which greatly empower individuals as well as business community. In today's competitive telecom market, differentiating services and features becomes one of the most important strategies for telephone service providers.

While the existing telecommunication technologies, including digital switching system (called switch), database, intelligent network, enable hundreds of subscriber features, they fail to meet the expectation at least at two fronts. First, it takes long time and high cost to implement features. This causes problem not only for adding new features to existing equipment, but also making it hard for vendors to introduce next generation of equipment. Second, the existing approach does not fully take the advantage of information available outside telephone network.

Specially, the information available on Internet is growing, and the combination of telephone network and Internet creates a previously unrealized potential for more advanced and powerful subscriber features. For example, in contrast to traditional Call Forward, a feature according to the present invention may allow a called party to redirect a terminating call to a new destination or an recorded announcement, based on the called party's personal schedule listed on web-site. By way of further example, a caller may also be allowed to make a call using name and address instead of telephone directory number, and the translation of name and address to direction number can be done through Directory Service on the Internet.

To understand the difficulty of features creation, one must understand how today's switched telephone network works.

FIG. 1 shows a typical telephone network, consisting of switches and Customer Premises Equipment (CPE)—such as a telephone, a smart terminal, a facsimile machine, Private Branched Exchange (PBX). Providing accessing telephone network services to users, CPE devices are connected electrically to switches via phone line, trunk, or other media. A phone call from user A to user B is handled through one or multiple switches in a relay fashion. Switches between a caller and a called party are connected with electrical communication path via trunks or other media.

Figure 2:
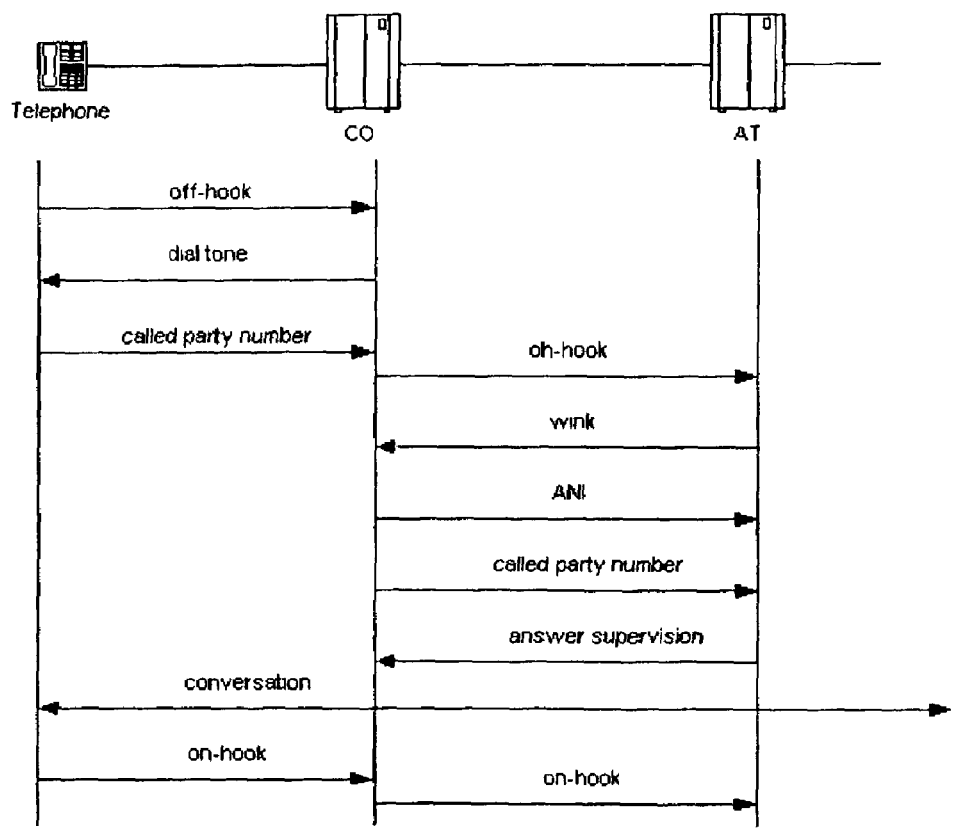
FIG. 2 is a block diagram of a first prior art telephone signaling system.
Figure 3:
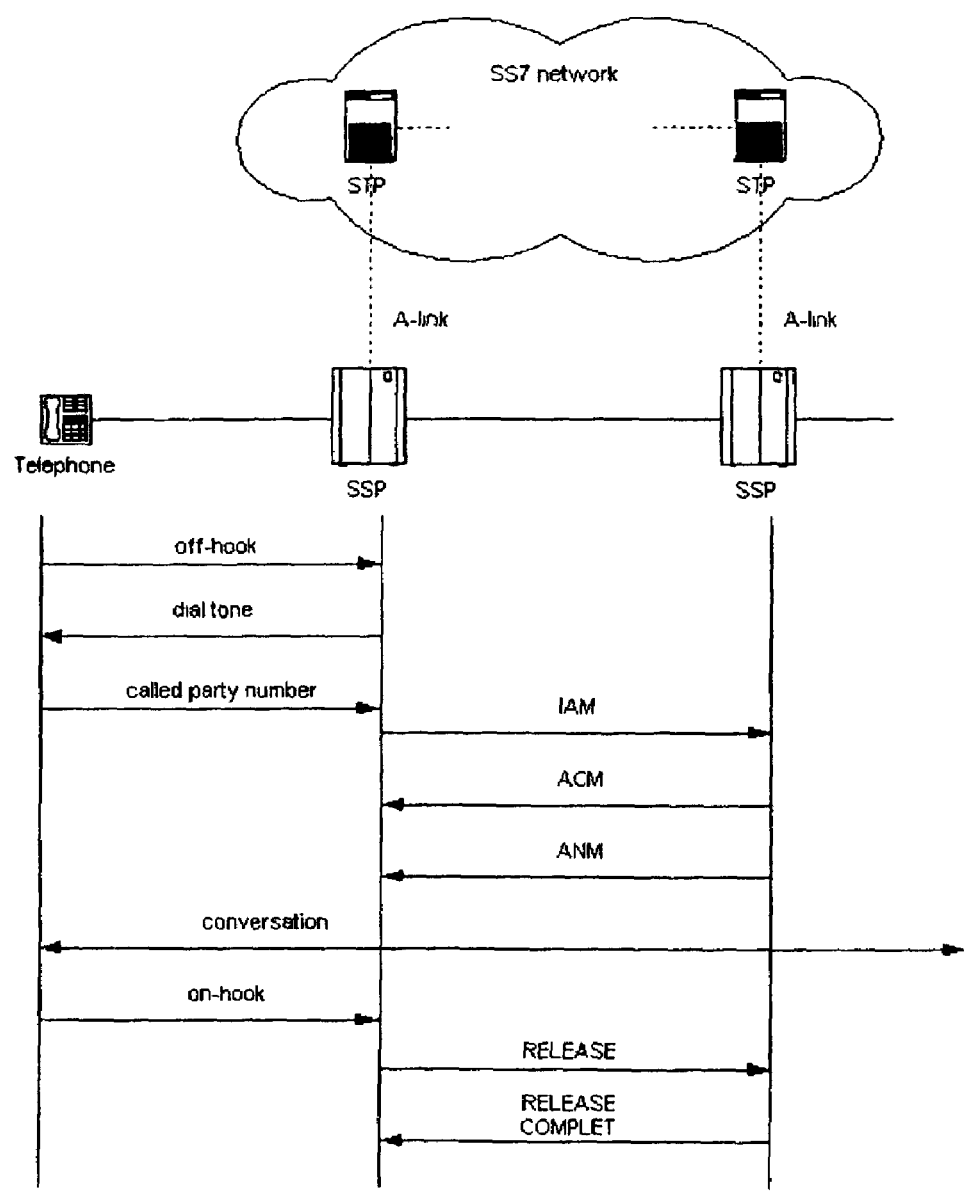
FIG. 3 is a block diagram of a second prior art telephone signaling system.

To establish or tear down a communication path between a caller and the called party (call setup and call release), call information such as called party number as well as line and trunk status has to be passed through the originating CPE to switches and to the terminating CPE. This is done through a system called signaling system. FIGS. 2 and 3 show two typical signaling systems used for call setup and tear down between two switches. In the configuration of FIG. 2, the so-called MF (Multi-Frequency) wink-start signaling system is used to carry calling party's billing, called party number, and carrier selection information. The line or trunk status is conveyed through "robbed-bit".

In the configuration of FIG. 3, the so-called System Signaling No. 7 (SS7) is used. Unlike MF signaling, SS7 utilizes an external packet data network to convey call information from one switch to the next. The signaling network consists of SSPs (Signaling Service Point)—switches with SS7 capability, and STPs (Service Transfer Point)—packet data switches capable of routing SS7 messages to destinations. The connectivity between signaling points is provided with a set of links (called A-, B-, C-, D-, E-, or F-link depending on the functionality of the link) each with a bandwidth of 56 kbits/s. Comparing with MF signaling, SS7 provides not only faster call control but also delivers a lot more call information to support features.

There are several matters involved in providing subscriber features: call information, service logic, basic call processing, and the status of facility. The call information provides, inter alia:

Caller information—such as calling party number and originating line type

Facility information—such as channel ID

Destination address—such as called party number

Billing information—such as charge number

Routing information—such as carrier identification code

Bearer service request—such as choosing 64 kbit/s clear channel, enable or disable echo cancel, data call, voice call, and etc.

Figure 4:
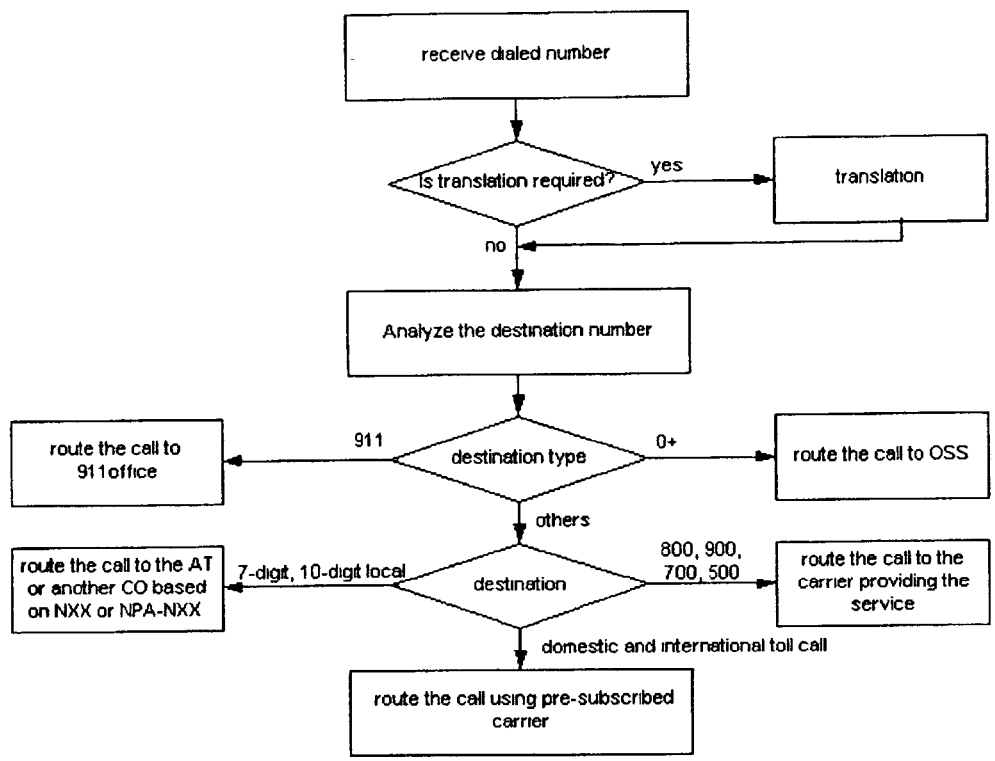
FIG. 4 is a flow chart of a call setup request.

Call events typically include:

Incoming call-setup request—in this event a switch receives request from proceeding switch or CPE device for call setup. The request can be initiated through variety of mechanism depending on the signaling in use. As shown in FIG. 3, a hook change from on-hook to off-hook is used in E&M signaling. As shown in FIG. 4, an IAM message is used in SS7-ISUP protocol for call setup request.

Call information collection—in this event call information is collected based on the signaling type. For example, when MF FGD signaling is used, it is expected that ANI (Automatic Number Identification), the original line information (II-digits), and the called party number will be received. If the switch functions as a Access Tandem, carrier identification code may also be received from CO.

User information collection and verification—In this event, additional caller information is collected through DTMF tone Routing—select a trunk group to route the call. The criteria of routing could be various:

Terminating—the called party is

Call release—This is an event when a call is dropped by either the caller or the called party, or by a switch. It is signaled through a hook change from off-hook to on-hook in E&M wink-start signaling. It is signaled through a RELEASE or RELEASE COMPLETE message in SS7-ISUP protocol.

Call events are monitored in switches. A subscriber feature may be involved in any of these events.

Service logic for controlling subscriber features utilizes call information, the status of facilities and call events. In a layered model, the service logic is sitting on top of call control logic and signaling control logic as well.

FIG. 4 demonstrates the service logic for a specific routing scheme. When a switch receives a setup request, it checks the profile of the circuit (either line or trunk) and the destination number as well to see whether the number needs to be translated A number 800, or 900 number, or a portable number may require translation. Selecting a route for a call normally depends on the call type. In the example, if the call is a 900 call or an operator assistant call, it is routed to a 900 office or the Operator Service System (OSS) through designated trunk groups. If the call is local and toll-free, it is routed based on pre-configured trunk groups. If the call is a domestic toll call or an international call, it is routed to the customer's pre-subscribed service providers.

Many features can be provided to subscribers in terms of choosing service providers. For instance, customer can be allowed to choose two carriers: one for local toll calls, the other for domestic and international toll calls. More sophisticated routing features may involve other information, such as time scheduling, the origination location of the call and etc. With the present invention, many useful route schemes can be implemented easily.

Figure 5:
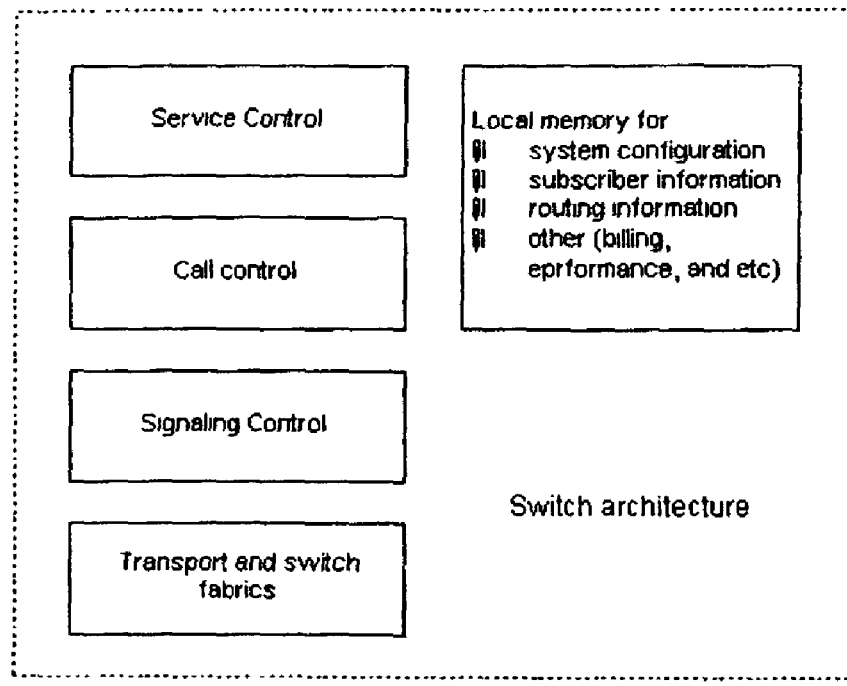
FIG. 5 is a block diagram of a telephone switch wherein the control logic is tightly associated with the hardware.

According to the prior art, the control logic, including signaling, basic call control and service logic, as well as data for supporting features are tightly associated with the hardware. FIG. 5 demonstrates a typical configuration of such switches. Other than the switching fabrics and interface for transportation and signaling, a switch system is equipped with CPUs running signaling, call control and service logic. To support subscriber features, it is also equipped with a local memory for storing database. In such system, the hardware, software and data are tightly coupled in the sense that the format of the data only is applicable to the specific implementation of the software, and the software from a vendor can only be run on a specific hardware environment. The hardware can not be upgraded and new customer features can not be added without major rework on the software.

To make situation even worse, relational databases, which are widely used in prior art systems, require highly rigid and complicated structures of information. Very often the data used to support a feature has to be mapped into tables regardless whether table is a good fit for the problem or not. When the features are simple and are not subject to frequent modifications, this approach may be acceptable. However, it becomes a big problem when features are required to be personalized or to be changed in real-time.

The difficulty comes from several fronts. The complexity of the relationship among tables is increased exponentially when the factors related to features increased. Second, the redesign of the schema of database is often needed when a new feature is introduced, no matter whether the new features are used by one customer or all customers. Every time when the schema is changed the whole database has to be rebuilt. In the routing example shown in FIG. 4, a relational database can be designed such that the destination type (like 911 call, operator call, long distance call etc) is used as index to the desired trunk groups. However, the database becomes complicated when time-sensitive or location-sensitive routing is desired for instance, even if there is few customers subscribed to that feature.

Figure 6:
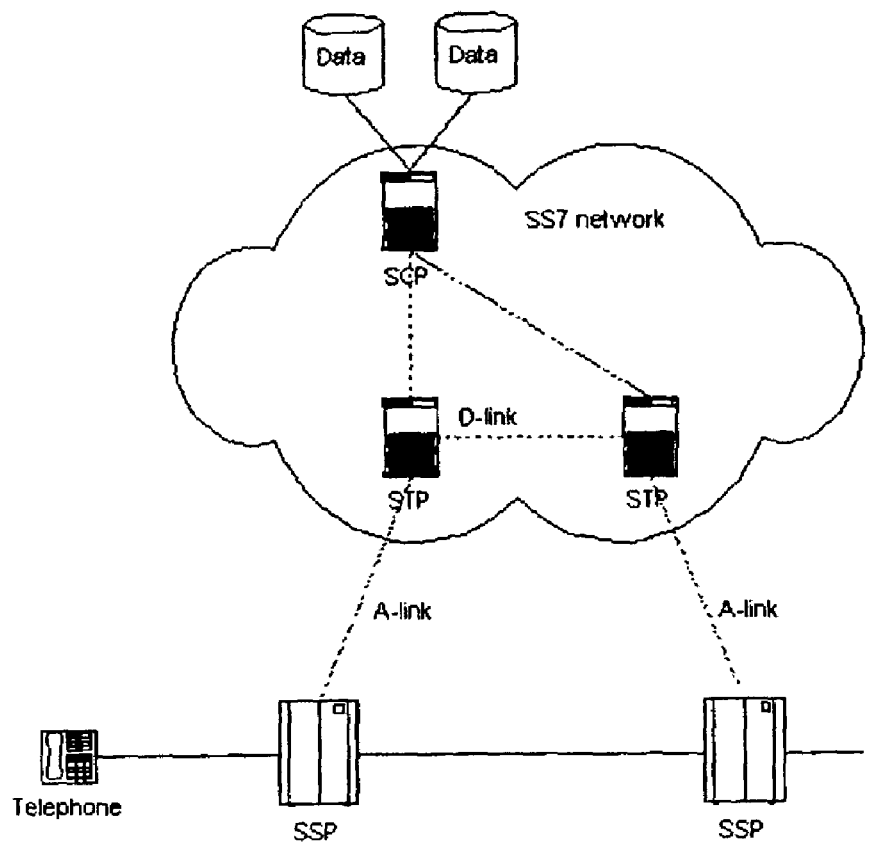
FIG. 6 is a block diagram of an Advanced Intelligent Network (AIN)

A simple configuration of Advanced Intelligent Network (AIN) is depicted in FIG. 6. In this architecture, a signaling point called SCP (Signaling Control Point) is provided. A SCP is a computer platform with SS7 connectivity, and it is loaded with software that has access to external database. In AIN, a switch (SSP) has the capability of setting up triggers and providing standard basic functions. When a call event occurs, a trigger may be encountered, and an AIN query is sent to SCP. Based on the query certain service logic is invoked on the SCP and a response will be sent back to SSP. A SCP can be accessed by any SSPs in the network, therefore the service logic and the supporting data in the SCP can be shared by many switches in the telephone network.

Figure 7:
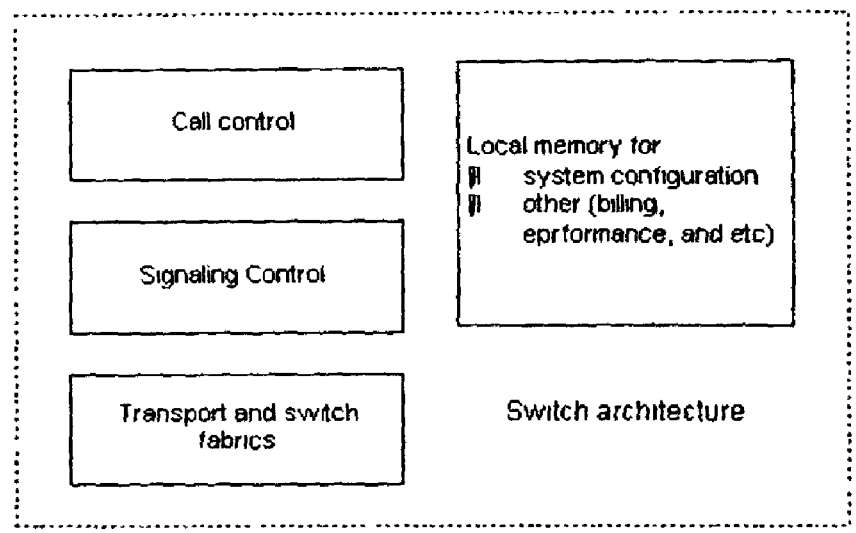
FIG. 7 is a functional diagram of a switch running in AIN.

FIG. 7 is the functional diagram of a switch running in AIN. In prior art systems, AIN plays the critical roles in providing several well-known telephone services such as 800 calling and Local Number Portability. AIN technology has its shortcomings. It is too complicated for service creation. Dozens of triggers are defined, implementation of which requires highly special expertise on programmers. The provisioning process of setting triggers in a switch to support new features is also difficult. Developing software on the SCP platform is even more a challenge. Also AIN is an SS7 based technology, it is incompatible to the emerging IP (Internet Protocol) based technology.

Figure 8:
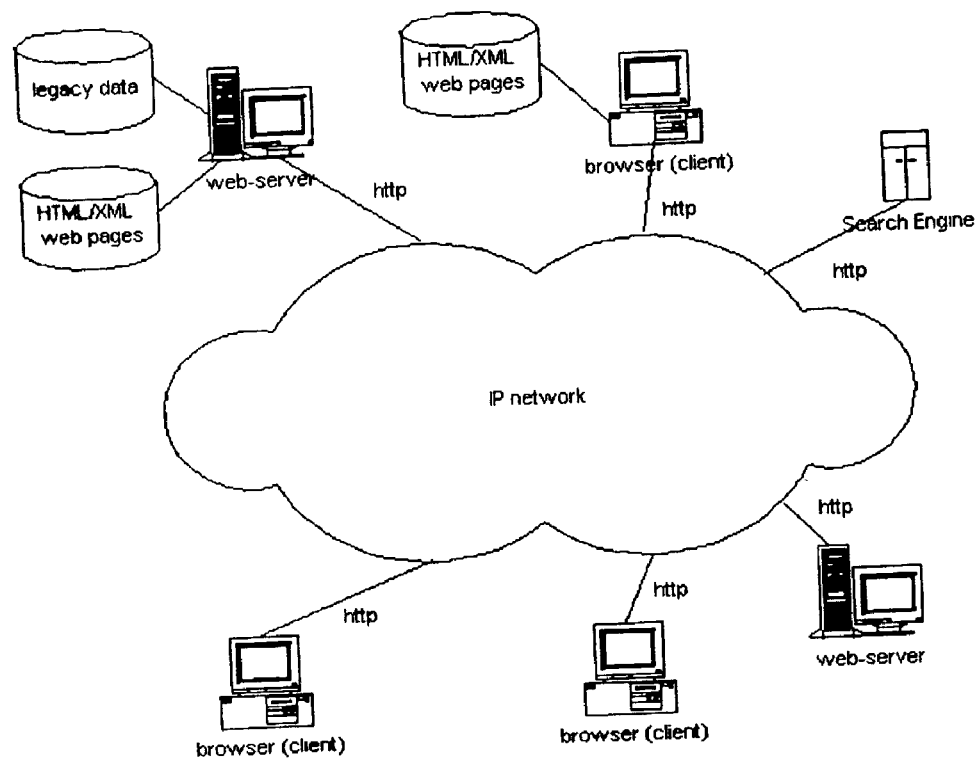
FIG. 8 is a block diagram of an IP-based network.

FIG. 8 depicts an IP based packet data network technology of the type with which the invention can be practiced. It provides attractive alternative technology for building telephone services. It can change the way that information (both voice and control data) are communicated, presented, organized, stored, and retrieved.

At the transmission level, technologies such as Ethernet, ATM, TMD, SONET, and etc. are used. The connection in the network is TCP/IP based, and on top of it, HTTP (Hypertext Transfer Protocol) is used for communication between client users and web-servers. The information is presented in formats like HTML or XML. The messages between clients and servers are routed via IP switch or router. Comparing with SS7 network, the bandwidth of IP based network is much cheaper, and the implementation of software is easier.

The client can be a browser or any application software with HTTP to communicate with servers. One of the main functions of a client in the network is to retrieve and transfer information. It is done through "GET"—retrieve information, "POST"—transfer information, and "PUT". As part of a client user, there is an HTML parser or XML parser used to abstract the information in web pages and present it in a tree fashion. The applications in a client take the information and process them.

The information in IP network is transferred and stored in either HTML or XML format, within so-called web pages that are identified with URLs (Uniform Resource Locators). In SS7 based network, the physical location of service information is important for SSP and STP in order to send service requests to the right servers. In contrast, in web-based information world, knowledge (web pages) is defined, maintained and stored independently. One page is related to others through hyperlink (a URL embedded in a web page). This allows information with complicated contents to be organized in a distributed and loosely coupled fashion.

HTML and XML (eXtensible Markup Language) are text based script languages, using "tag" and attributes to represent information objects. Unlike HTML, XML allows user to define new tags and attributes as needed to present the logic structure of information in a natural way. In comparison with traditional data structure used in database, information presented with XML is machine-readable and human-readable.

Figure 9:
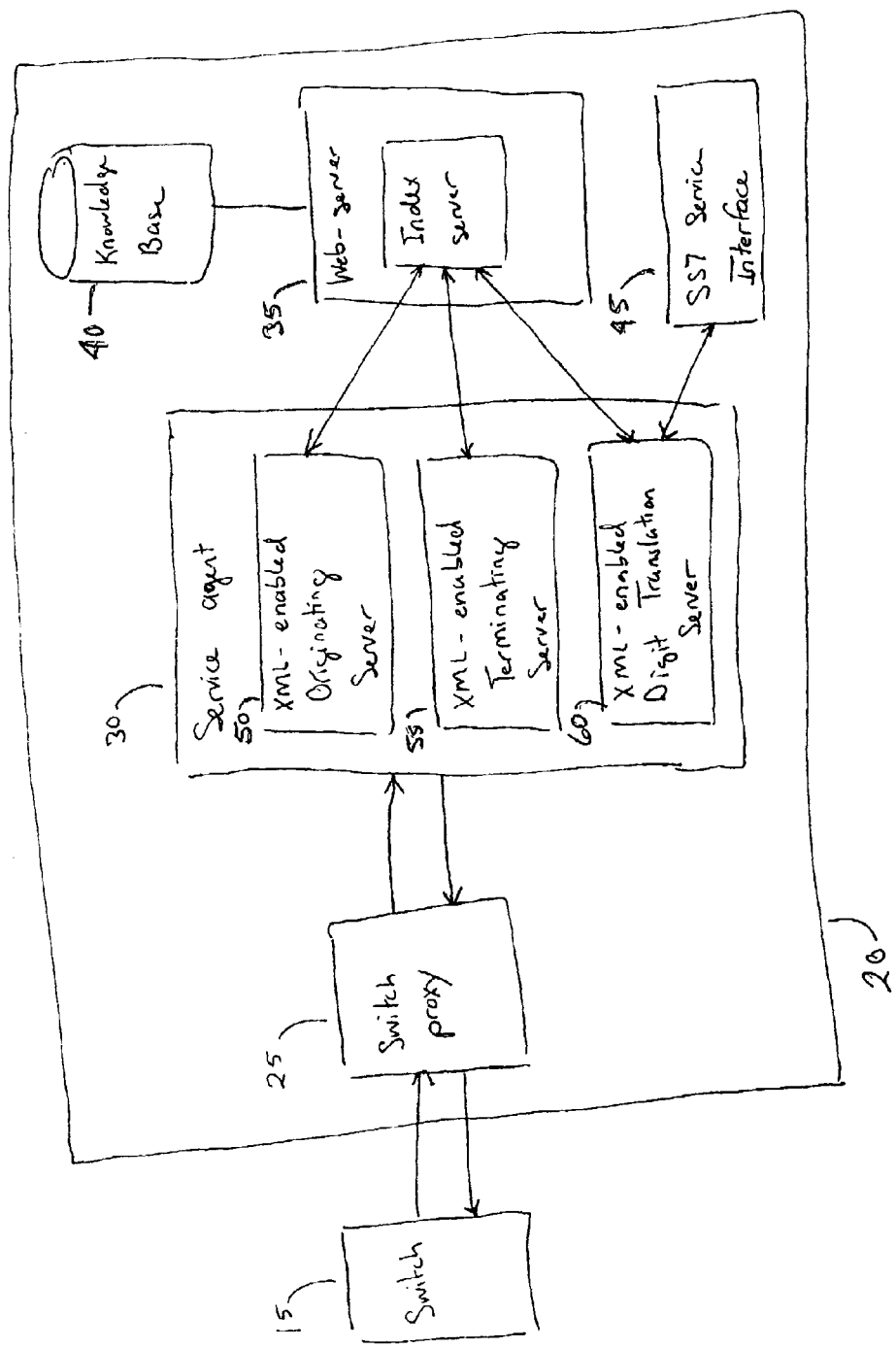
FIG. 9 is a block diagram of a system according to the invention.

FIG. 9 is a block diagram of an embodiment of the invention. The call setup system 10 has a Web-enabled switch 15 and a Internet Protocol (IP) network 20. The IP network 20 has a switch proxy 25, a service agent 30, a Web server 35, a knowledge base 40, and an SS7 Service interface 45. The service agent 30 has an XML-enabled originating server 50, an XML-enabled terminating server 55, an XML-enabled Digit translation server 60. The Web server 40 has an index server 65.

In the illustrated embodiment of the invention, call service logic is decoupled from the switch. In operation, a call request comes through the switch 15. The switch proxy 25 allows the call setup system to operate with existing switches. So, the switch 15 may be any one of a number of existing switches used in telephone networks.

The call request is forwarded to the service agent 30. A service agent 30 manages the call data retrieval process. The service agent 30 has a number of search engines, the XML-enabled originating server 50, the XML-enabled terminating server 55, and the XML-enabled Digit translation server 60, that go through the Web server 35, using the index server 65, to find Web pages in the knowledge base 40. The Web pages in the knowledge base have data on how a particular call should be handled. Once the service agent 30, finds the appropriate Web page in the knowledge base 40, it parses that Web page into switch instructions. The service agent 30 sends the switch instructions back to the switch through the switch proxy 25. The switch instructions are layered onto the switch and the switch handles the call according to the delivered instructions.

The service agent, in the illustrated embodiment of the invention is XML-based meaning XML or a similar standard (e.g., CPML, as described below). eXtensible Markup Language (XML) was developed by the SGML Editorial Board formed under the auspices of the World Wide Web Consortium (W3C) in 1996. XML is a pared-down version of Standard Generalized Markup Language (SGML), designed especially for Web documents. However XML is also useful for object-oriented databases.

The following is a list of intelligent telephony services that may be offered using one preferred embodiment of the present invention. The list of services is merely exemplary and the services available using the present invention is not limited to those listed.

Abbreviated dialing (ABD): This service is an originating line feature that allows business subscribers to dial others in their company using, e.g. only four digits even if the calling user's line and the called user's line are served by different switches.

Account card calling (ACC): This service allows the caller to be automatically charged on a telephone account subscribed with the network operator, for any type of outgoing call. The caller has to dial his or her card number and a PIN, then the called number. As an option, forward calls may be allowed, without dialing the card number and PIN again.

Automatic alternative billing (AAB): This service allows a user to call another user and ask him or her to receive the call at his or her expense. Two steps are involved: the calling party is welcomed to record a brief message giving the caller's name and explaining the call reason, then the called party is alerted, receives the recorded message and is asked to accept to be charged for that call.

Call distribution (CD): This service allows a subscriber to having incoming calls routed to different destinations, according to an allocation law which may be real-time managed by the subscriber. Three types of law may exist: 1) circular distribution, where the calls are routed to the different locations with a uniform load; 2) percentage distribution, where the calls are routed to the different locations according to a percentage; and 3) hierarchical distribution, where the first location to be chosen is the first met in the priority list. In addition, congestion at one location may cause overflow calls to be routed to an alternate location.

Call forwarding (CF): Call forwarding allows the called user to forward calls to another telephone number when this service is activated. With this service, all calls destined to the subscriber's number are redirected to the new telephone number. This service is under control of the subscriber and can be activated/deactivated by the subscriber. When this service is activated, the subscriber's line will receive an alerting ring, "reminder ring", to indicate that the service is activated.

Call rerouting distribution (CRD): This service permits the subscriber to have his or her incoming calls encountering a triggering condition (busy, specified number of rings, queue overload or call limiter) rerouted according to a predefined choice: the calls may be rerouted to another destination number (including pager or vocal box), rerouted on a standard or customized announcement, or queued.

Conference calling add-on: This service allows the user to reserve a conference resource for making a multi-party call, indicating the date, time and conference duration. Once the conference is active, the user controls the conference, and may add, drop, isolate, reattach or split parties.

Conference calling meet-me: This service allows the user to reserve a conference resource for making a multi-party call, indicating the date, time and conference duration. In due time, each participant in the conference has to dial a special number which has been attached to the booked conference, in order to access the conference bridge.

Credit card calling (CCC): This service allows the caller to be automatically charged on a bank card account, for any type of outgoing call. The caller has to dial his card number and a PIN, then the called number.

Destination call routing (DCR): This service allows customers to specify the routing of their calls to destinations according to: a) time of day, day of week, etc.; b) area of call origination; c) calling line identity of customer; d) service attributes held against the customer; e) priority (e.g. from input of a PIN); f) charge rates applicable for the destinations; and g) proportional routing of traffic.

Follow-me diversion (FMD): With this service, a user may register for incoming calls to any terminal access. When registered, all incoming calls to the user will be presented to this terminal access. A registration for incoming calls will cancel any previous registration. Several users may register for incoming calls to the same terminal access simultaneously. The user may also explicitly deregister for incoming calls.

Originating call screening (OCS): Originating calls may be controlled by the originating call screening capability. This allows the subscriber to specify that outgoing calls be either restricted or allowed, according to a screening list and, optionally, by time of day control. This can be overridden on a per-call basis by anyone with the proper identity code. Typical scenarios might include: 1) Calling user A attempts to make a call. The call is screened via the screening list assigned to the originating line. The call is allowed to complete and is connected; 2) Calling user A attempts to make a call to a line with deactivated override feature. The call is screened via the screening list assigned to the originating line. The call is not allowed to complete. Because the override option is not active, there are no override prompts; 3) Calling user A attempts to make a call to a line with an activated override feature. The call is screened via the screening list assigned to the originating line. The call is not allowed to complete. Because the override option is active, the user is prompted for the identity code and enters the proper code. The call is connected.

Security screening (SEC): This capability allows security screening to be performed in the network before an end-user gains access to the subscriber's network, systems, or applications. Access code abuse detection is a capability which will generate a report on the invalid access attempts: how many, over what time period, by whom, and from where. This provides an added layer of security. The following are typical call scenarios for these capabilities: 1) Caller A dials subscriber's DN, enters correct personal identification number (PIN) when prompted, clears network screening and is connected. Call data is recorded. 2) Caller B dials subscriber's DN, enters invalid PIN on first and subsequent prompts, fails network screening, and is connected to announcement. Call data is recorded and reports of invalid codes attempted are printed. 3) Caller C dials subscriber's DN, initially enters incorrect PIN, but corrects it upon re-prompt, clears network screening, and is connected. Call data is recorded along with re-prompts/re-entries.

Selective call forwarding on busy/don't answer (SCF): Selective call-forwarding—busy/don't answer (SCF-BY/DA) allows the called user to forward particular pre-selected calls if the called user is busy or does not answer within Y seconds or X rings. The calls will be pre-selected based upon an SCF-BY/DA list. This list will have 1 to 5 or 1 to 10 numbers with a default call forward number for calling users not in the list. There will also be remote access and time of day indicators for this capability. Typical scenarios may include: 1) Called user B has SCF-BY/DA assigned. Caller A dials B's number, called B does not answer the phone with Y seconds. Based upon the SCF-BY/DA list, caller A is forwarded to user C. 2) Called user B has SCF-BY/DA assigned. Caller D dials called B's number, called B is busy with called user C. Based upon the SCF-BY/DA list, caller D is forwarded to user E. 3) Called user B has SCF-BY/DA assigned. Call A and Caller C dial called B's number, called B does not answer the phone within Y seconds. Based upon the SCF-BY/DA list entry for caller A, caller A is forwarded to user D. Caller C is not in the list, therefore caller C is forwarded to default user E.

Selective call forwarding: This service permits the user to have his incoming calls addressed to another number, no matter what the called party line status is, if the calling line identify is included in, or excluded from, a screening list. The user's originating service is unaffected, even for charging.

Call forwarding on busy: This service permits the user to have his incoming calls addressed to another number, if they encounter a busy condition. The user's originating service is unaffected, even for charging.

Call forwarding on don't answer (no reply): This service permits the user to have his incoming calls addressed to another number, if they encounter no reply. The user's originating service is unaffected, even for charging.

Terminating call screening (TCS): Terminating calls may be controlled by the terminating call screening capability. This allows the subscriber to specify that incoming calls be either restricted or allowed, according to a screening list and optionally, by time of day control. Typical scenarios might include: 1) Calling user A attempts to make a call to B. The call is screened via the screening list assigned to B's line. The call is allowed to complete and is connected. 2) Calling user A attempts to make a call to B. The call is screened via the screening lit to B's line. The call is not allowed to complete and is connected to an announcement.

Universal access number (UAN): This service enables a service provider to publish a national number and have incoming calls routed to a number of different destinations based on the geographical location of the caller. One typical scenario might have the published national number as a free phone number. There should be an option to provide the service provider with subscriber data on all incoming calls such as date and time of call and the service provider's location that the call was routed to.

User-defined routing (UDR): This capability allows the subscriber to specify how outgoing calls, from the subscriber's location, shall be routed, either through private, public, or virtual facilities or a mix of facilities, according to the subscriber's routing preference list. These lists will apply to individual lines or to several lines at the subscriber's location. Typical scenarios might include: 1) Calling user A dials from the subscriber's line; the subscriber's routing list specifies the call will only be routed over private facilities.

2) Calling user A dials from the subscriber's line and the subscriber's routing list allows public facilities between 1600 and 0800 and private facilities 0800 to 1600. Time is 1531, so call is routed only over private facilities to location. Calling User A now dials from subscriber's line at 1608 and so call is routed over public route to the destination.

Time-dependent CF: Forward call depending on time-of-day, day-of-week, holiday, etc.

FIG. 10 is an example of a Web page containing call handling data in XML format according to principles of the invention. The Web page gives instructions for a call forwarding service and a security screening service. This is stored on the knowledge base to be retrieved by the service agent for instructing the switch in handling a particular call.

Extensible Service Policy Architecture (ESPA)

Voice services make up two-thirds of the revenues of even the most data-centric major carrier, and custom calling services provide more local exchange revenues than all data services combined. While data will certainly make up a major new source of profits, the winning carrier in today's competitive market will be the one who makes the most of voice. Thus, voice service creation is an essential ingredient for differentiation, and ultimately the success of the next generation communications provider.

A pure IP network promises to deliver a rich set of telecommunications features, but circuit, packet, and cell switching will coexist for years to come. A solution that recognizes the transitional and fragmented state of the network is needed for providing carriers with the ability to rapidly implement new, customized services.

The Extensible Service Policy Architecture (ESPA) of the invention defines a network architecture for delivering services that utilizes web-based service logic and IP message distribution. ESPA provides a framework for services creation, deployment, and administration based upon the model of the Internet. It is designed to provide a common structure on which to implement and scale applications that can be used over any transmission or switching media.

As discussed, historically, telecom networks were constructed from a generic set of class 4 and 5 switches. Now they are built from an expanding set of multi-service, multi-media network elements. AIN's drive for functionality led to increased complexity and has proven itself not conducive to robust service creation.

ESPA recognizes the need for interoperability with AIN based switches yet rejects the notion that the complexity of an AIN interface should be extended to other network elements. Instead, ESPA draws upon the full range of Internet, XML, and Web tools to deliver a service creation and delivery environment for next generation networks. It brings the legacy PSTN under the supervision of a powerful and flexible IP based control network to immediately achieve the robust functionality promised by IP called "Voice under IP™". VoIP (Voice over IP) delivers simplified and more economical networks, however "Voice under IP™" delivers services.

With different network models being introduced as rapidly as the number of carriers and their corresponding business models, service creation must be simplified. ESPA separates service creation from network control and achieves its power through simplicity. Today, carriers must rapidly deliver new services, differentiated from those of their competitors, over networks based upon different transmission methodologies and consisting of varied switching elements, protocols, and APIs. ESPA offers a common, simple method of service definition that binds these different environments and can scale from a personal or enterprise to a large carrier.

ESPA is set-apart, at least in part, by its reliance upon a combination of search engine technology and new tools (based on XML) for storing knowledge along with data to distribute call policy (applications) to web pages. It is an open architecture which relies on APIs to communicate with network elements such as switches and an open XML-based language called Call Policy Markup Language (CPML) for service definition.

CPML is an open language according to the invention that is used to simply describe call processing. CPML is an extension of XML (eXtensible Markup Language) that is a standards-based, meta-language from which other languages are derived. CPML permits migration of the operations of the telecommunications network, including its features, functions, and enhanced services, out of the world of proprietary operating systems, structured databases, and complex programs or APIs. CPML opens the telecommunications network to basic IP tools that bring order to its complexity and empowers carriers, and ultimately customers, to control, customize, and extend the functionality and usefulness of the telecommunications network.

Like HTML, CPML is used to create web pages. Unlike HTML pages that are used to present visual context, CPML pages are designed to be used by a network switching element to present the appropriate service logic (switch action) for a particular customer, or group of customers.

ESPA makes use of search engine technology in a real time mode. This attribute is called the "Dynamically Searchable Policy." An ESPA based network has the power to quickly locate among a loosely coupled body of data the correct web page for needed service logic and then to interpret that page into switch functions. Central to this ability is CPML which leverages internet technologies to enable the execution of service logic in an interpretive manner rather than from compiled code.

For a typical call in an ESPA based network, a switch will convert the information associated with a call (i.e. calling party number, destination number, carrier choice, time schedule) into keywords in an internet type search which are used to locate the correct CPML web page. That page will incorporate service logic (i.e. routing, restrictions, digit-translation, etc.), scripted in CPML, which will be interpreted into switch function.

Figure 11:
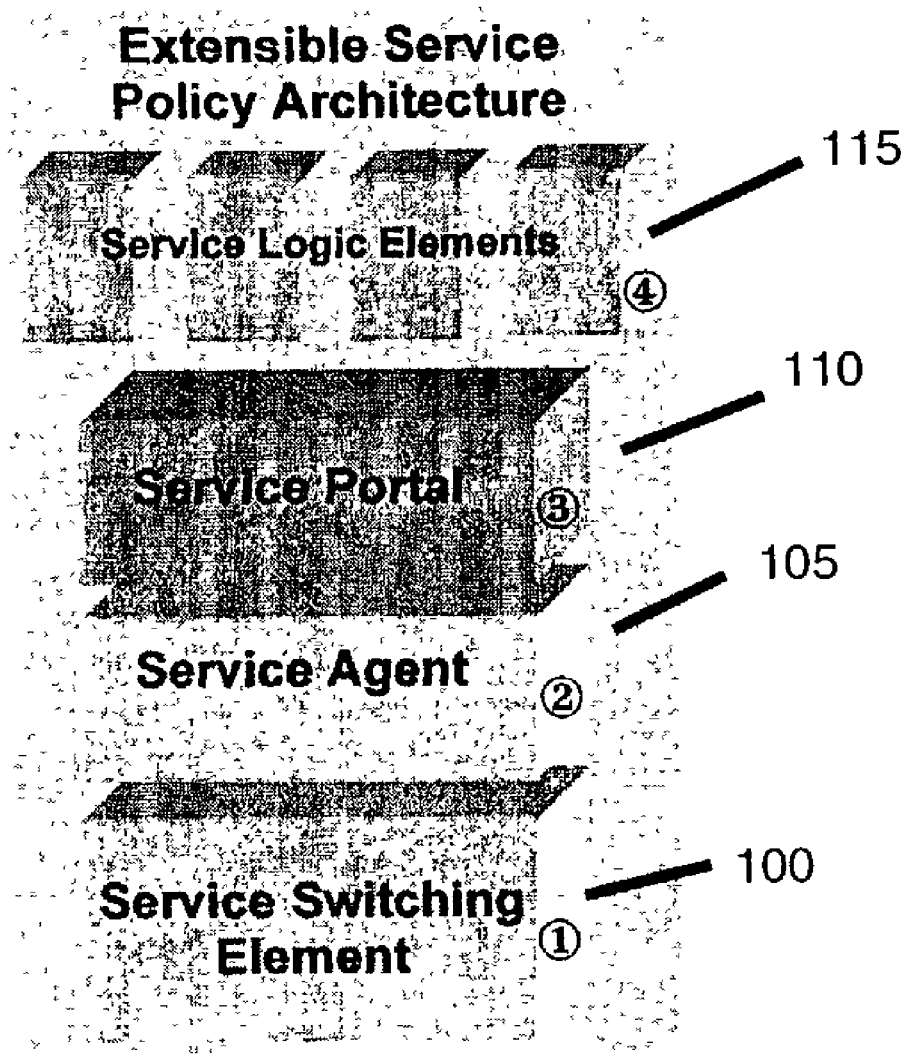
FIG. 11 is a block diagram of the primary components of an Extensible Service Policy Architecture according to the invention.

FIG. 11 shows the four primary components of the Extensible Service Policy Architecture:

1. A Service Switching Element 100 is a physical switching element in the network that may be a Class 5 switch, ATM switch, DSLAM, RAS, PBX, IAD, Router, or other.

2. A Service Agent 105 is a network based software module adapted to the underlying Service Switching Element in order to mediate signaling and interpret control. It functions as a proxy to underlying protocols such as MGCP, or APIs such as PARLEY. The Service Agent 105 communicates with a higher level Service Portal for service logic.

3. A Service Portal 110 is a web site used to house, access, organize, and index service logic elements. The service portal incorporates a number of functional elements including directory servers, a firewall if open to the internet, search engines, call policy servers, application servers, a billing event manager, an SNMP agent, a CPML interpreter, and a repository for CPML pages. The Service Portal continuously indexes the locations of service logic elements, and upon query from a service-switching element, searches and interprets service logic and associated data points into switch function.

4. Service Logic Elements 115 include CPML pages, databases (i.e. LNP, calling name, LDAP . . . ), a configuration directory, and other internet-based information that might be used in call processing. The CPML repository and other call processing information can be co-located with the Service Portal or at any desirable web site. A strength of ESPA is that it can incorporate into call processing any information available on the Internet (at a carriers option).

An application of the extensible service policy architecture is the DXC Class 4/5 switch 200, shown in FIG. 12. The DXC switch performs switch and routing configuration, SS7 functions, and service definition. A second application of the extensible service policy architecture is the switch 250, shown in FIG. 13. The switch 250 is a multi-service switch that incorporates the basic functionality of a Class 4/5 switch. The switch 250 improves upon the scale and density of the DXC switch 200, offering superior interface flexibility, and incorporating voice processing and VoIp capabilities.

Designed to play a critical role in many network configurations for next generation carriers, the switch 250 is a powerful DSP based voice-processing platform. It can fill the roll of a carrier tandem, end office, an enhanced services platform, an intelligent peripheral, or a VoIP gateway.

A real differentiation for the switch 250 is its capability to deliver features. Its fabric incorporates tremendous voice processing capability, and it is the flexibility of the Telecommunication Services Portal that enables the switch 250 to translate those capabilities into services.

In operation, the Telecommunication Services Portal (TSP) is queried upon receipt of a call into the switch. The TSP locates and interprets the appropriate CPML page that defines the call process model. For example, a typical call process for call setup includes the following components:

Originating policy—defines conditions for authentication, screening, call restriction (like call type, destination, and usage-related conditions), and others.

Digit translation—defines conditions for caller information as well as destination code translation. Examples are translation for Local Number Portability, 800 calls, calling party name, and others.

Routing policy—defines rules of selecting routings for calls terminating to a device outside the system. Examples are selecting a carrier for domestic long distance and international call, originating location sensitive routing, destination sensitive routing, time-of-day, day-of-week routing, and others.

Terminating policy—defines terminating conditions for calls terminating to customers served by the system. Examples include call forward, call acceptance, call rejection, security screening, and others. Information like time, calling party number, circuit status, authorization code, customer's personal information (like schedule and others) can all be used in the terminating policy.

Other service logic—defines control logic for special service application. Examples are calling card service, debit card service, unified messaging functions, and others.

Upon searching and interpreting all relevant service logic and data, the TSP delivers to the switch instructions.

Figure 14:
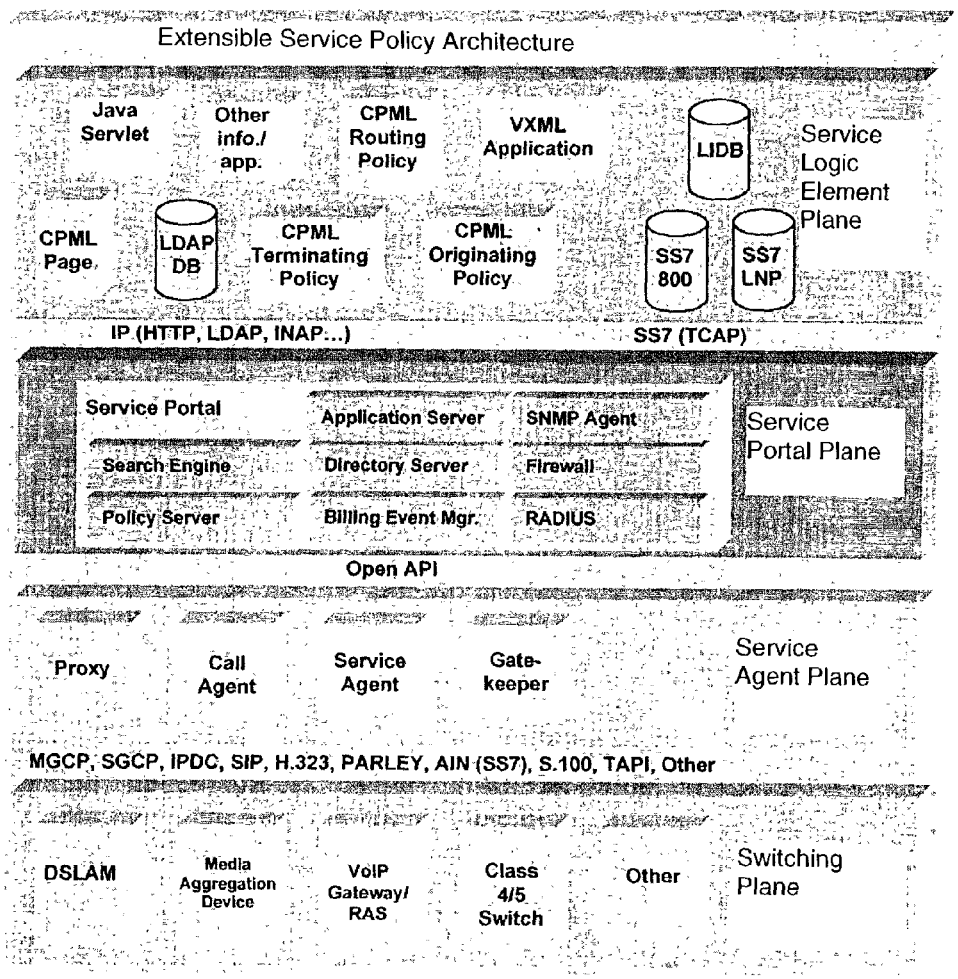

FIG. 14 is a more detailed diagram of the Extensible Service Policy Architecture. The characteristics of Extensible Service Policy Architecture are:

1. Separation of service logic from transmission, hardware, and signaling—ESPA separates into logical planes, as shown in FIG. 14, the functions required for call processing, making them easier to manage and enhance. The CPML pages, themselves, relate only to a definition of the service and avoid characteristics that would tie the service logic to a particular switching platform or transmission methodology. Through this abstraction, ESPA CPML can be simplified to the degree where authors of services do not have to have detailed technical knowledge.

2. Compatibility—A natural extension of the abstraction and layering used by ESPA is its ability to be made compatible with multiple systems, protocols, and transmission methods. As a language for defining service logic, CPML is independent of the underlying network (i.e. TDM, ATM, or IP) and is system independent in the sense that CPML defines call behavior that operates across multiple network elements. Through the use of a service portal and appropriate service agents, call behavior can be located and presented via the correct protocol to multiple types of systems.

3. Loosely coupled and distributed information—One functional element of a Service Portal is a Policy Server that performs the search and interpretation function: first locating the controlling CPML page and then interpreting its content into switch function. In a world where carriers can have thousands, or millions of customers, each desiring custom call behavior, the data and the applications, themselves, have to be decoupled to achieve scale and reliability. The ability to define CPML pages for individual subscribers enables powerful flexibility without the complexity of rigidly organizing all customer data into a relational database. The interdependency between customer applications is broken. Just as a nonfunctional web page does not impact the operation of the Internet as a whole, a poorly written feature does not affect other customers. In additional, the logic and data referenced for call processing may easily be distributed onto different servers or networks.

4. Searchable information—The loose coupling of data presents a problem with access to that information by a real time application. Fortunately, the Internet has spawned powerful tools such as search engines to solve this problem. ESPA relies upon the fuzzy logic of search engines to quickly locate requested data, and can operate efficiently with a widely distributed base of information.

5. Interpretative logic execution—Today's dynamic market demands more features, carrier differentiation, and subscriber customization. Modern techniques such as object-oriented programming make software easier to adapt to the requirements of an evolving market but do not change the basic model common in telecommunications of shared program logic coupled to a relational database. The nature of this model makes software upgrades that require a change to the database cumbersome. The tight coupling of service logic and database mandates significant regression testing of features upon upgrade. Rather than being a repository for service logic programming (i.e. compiled code), the Call Policy Server module of the Service Portal functions as a CPML interpreter. This interpretative function allows the editing of individual features or specific subscriber implementations of features and is one of the key reasons that ESPA enables rapid service creation.

6. Concise, open language—CPML is a concise language that reduces the description of call processing to the minimal set of approximately 30 elements. The simplicity of this open message set is the essence of its power.

7. XML defined service logic—CPML is an extension of XML (Extensible Markup Language). One way of thinking of XML is as a universal data translator. XML provides a standard framework with which data can be organized, and through this organization it allows knowledge to be stored along with data. Data stored in XML is often referred to as a knowledge base rather than a database.

8. Extensibility—Because of its open architecture and reliance upon the basic tools of the Internet, ESPA allows tremendous extension of its functions. Its Services Logic Elements may include widely distributed CPML pages as well as data elements inclusive of any data present on the Internet. For example, an Internet based personal calendar (i.e. "vCalender") may be referenced to determine that a subscriber's calls should be forwarded because he/she is out of town. In addition, CPML pages can be enhanced with JAVA servlets or linked to other applications.

9. Scalability—ESPA operates with low latency under heavy call load and can easily scale to handle millions of busy hour call attempts through a single Service Portal. Additionally, its architecture allows software functions to be distributed for even greater scale and reliability.

Robust service creation requires a solution that bridges switched and IP networks—one that is simple, nimble, scaleable and leverages tools that have proven themselves by handling the incredible expansion of the Internet. The answer is to bring the legacy PSTN under the supervision of a powerful and flexible IP based control network to achieve now the robust functionality promised by IP.

By using XML (eXtensible Markup Language) to create a simplified telecommunications control language common to PSTN and VoIP networks, system integrators, service providers and subscribers are empowered to create and maintain features with the same ease that people publish and maintain web pages. By further leveraging the high transaction search and interpret tools available today, a carrier can create a service network that is scaleable in capacity, extensible in function, highly accessible and reliable. By combining all these functions, a carrier can take control of telecommunications services with a software architecture that will outlive the network's transition from circuit switched to IP based transmission. The architecture that delivers this control is the Extensible Service Policy Architecture.

FIG. 15 depicts use of a markup language CPML (which is based on XML and XML-like constructs) according to the invention to encode call service logic. The main information carried by this XML page is: "900 number call or international call should be rejected" after 18:00 PM to 8:00 AM". Elements ("tag")—including "case", "schedule", "period", "scenario", "info", "release" and etc, as well as attributes—including "lookup", "target", "reMethod" and etc, are used to describe the logic. It is important to notice that within a XML page not only the data such as "8:00 AM", "18:00 PM", "900 call" and "international call" are presented but also the logic behind these data is presented.

Advantages of using XML in this manner includes the low-cost associated with software development because of the widely availability of third party software such XML parser and authoring tools.

In an IP network-based system according to the invention, a web-server provides services to clients by receiving request (GET, POST, PUT) from clients through HTTP, processing it and sending response back in HTML or XML format. Normally a web-server maintains web pages, and when a retrieval request is received from a client the URL is used to identify the page. Several technologies such as Java, CGI and Servlet further empower a server. With these technologies, information in legacy format (such relational database) can be available to web client. The data conversion is done by applications in server "on-fly". Comparing with proprietary technologies like SS7, web-server as information repository provides excellent scalability, security, reliability, and maintainability in a much lower cost.

The IP network, as used in systems according to the invention, endorses a distributed architecture in which information (web page and legacy data) are loosely coupled in the sense that they are stored, created and maintained individually. Updating and creating data imposes minimum impact on using other data. The format or structure of one group of data does not depend on the format or structure of other data. The programmers and users of client software is not required to know in advanced the location of the information of interest.

The search engine plays a role in an Internet architecture. When certain information is desired, the users use "keywords" to describe the piece of information, and send them to the search engine. A search engine normally contains indexed tables that consist of URLs of information available in the network and the corresponding searchable keywords. A component called "spider" is constantly running to visit every known web-side, and the indexed tables are updated based on that. When a request from a HTTP client is received, a search engine takes the keywords and applies a set of pre-defined rules (such as full-text-search, tag-search, and etc) to retrieve the URL of relevant information from the index tables. The accuracy of the information retrieved pretty much depends on the keywords and the search rules applied. With the capability to define "tag" based applications, using XML to describe information can improve search accuracy greatly. "Cache" technology and "search tree" technology usually is used in search engine to improve the search performance.

Call Policy and Call Policy Markup Language

The text based script language, Call Policy Markup Language (CPML), according to the invention describes call-related policy. CPML is an application of XML. It defines a set of "tags" called "elements" that are used to describe call conditions and actions. A collection of conditions, called "scenario" together with one action, such as "release a call" or "redirect a call", forms a rule, called "case". When a call event matches a condition, the call control takes the action. Service logic behind subscriber features is presented as a series of policies each further presented as a collection of rules.

A policy can be designed to be associated with a specific call process.

For example, an "originating policy" for call originating process, "routing policy" for call routing process, "terminating policy" for call terminating process. A policy may cover multiple service features. For instance, a "originating policy" can be designed to cover to features like authentication, ANI screening, destination restriction, service denial, and etc. Additional user information like PIN may be collected in the process. A "routing policy" can be designed to cover all the features PIC-routing, location-sensitive routing, time-sensitive routing, service-sensitive routing, scheduled routing, PIN-based routing, and etc. A "terminating policy" may cover features like, "selective call acceptance", "security screening", "call forwarding", and etc. A policy can be designed for an individual, a group of individuals, and a network facility such as a trunk group or even a switch to realize a specific set of service features.

A rule can be as simple as "unconditionally reject any incoming call request" by setting the condition set as empty and the action as "release call". A more complicated rule could be "if a call is a toll call, use carrier A on Monday to Friday from 8:00 AM to 18:00 PM". In this case, the condition is "the call is a toll call", the schedule is "Monday to Friday from 8:00 AM to 18:00 PM", and the action is "route the call to carrier A".

Multiple rules may be used with a policy. A possible routing policy, for example, may consist of the following three rules:
1. "If a call is a toll call, use carrier A on Monday to Friday from 8:00 AM to 18: PM"
2. "In other time, use carrier B for toll calls"
3. "If a call is a local toll free call, route the call to trunk group A"

In one preferred implementation, a policy may be presented on pages written in CPML language. A CPML page (simple called "page" when meaning is clear) consists of an identifier, a title, policy type, the owner of the policy, the priority, and rules.
1. An Identifier. A policy page is viewed as an object in IP network, and an URL (Universal Resource Locator) is used as an identifier. Providing an identifier allows one page to be linked to others.
2. The title. A title, a sequence of characters, is used to enhance the readability of the page, and it does not have any semantic significance.
3. The policy type. Policy type, a sequence of string, is used to describe the usage of a policy. In one preferred implementation, possible policy types are ORIGINATION, ROUTING, TERMINATION, TRANSLATION, and CALLSETUP. A policy with type ORINIATION is an originating policy, a policy with ROUTIGN is a routing policy, and so on and so force.
4. The owner of the policy—this is a searchable element in the page used for search engine to identify the right page for the right customer. It could be a facility ID (switch ID, trunk group, port), or a customer ID (calling party number, URL, email address, and etc). When a policy page is shared by more than one user, multiple ID may be listed.
5. The rules will be discussed below.
6. Sub-policy In the highest level, a CPML script includes like a collection of CASEs (rules), and each CASE contains one scenario, one schedule (optional), and one action. The scenario describes "What happens", the schedule describes "When it happens", and the action describes "What to do". Multiple CASEs are allowed on a page, and they should be listed on the page in linear sequential order. When a query is received from a switch, the call information is used to check against each CASE in sequential order from the top to the bottom. In the checking process, the scenario and schedule within a CASE will be tested. A scenario is satisfied if the call information match the condition described by the scenario. A schedule is satisfied if the current time matches the schedule condition. An action is selected, only if both the scenario and the schedule are satisfied. The "checking process" stops when an action is selected.

Like any other web page, a CPML page can be linked to other CPML pages through hyperlink.

CASE Element. It describes a rule by associating a collection of a snapshot of call condition (SCENARIO element) with a schedule (SCHEDULE element) and an action (ROUTE element, RELEASE element, REDIRECT element, COLLECT element, and LINK element). When a query is received from a switch, the call information will be used to test against SCENARIO and the current time is used to test against SCHEDULE.

The result of testing SCENARIO and SCHEDULE will be either "Yes" or "No". The action in the CASE should be taken when "Yes" is returned from both SCENARIO and SCHEDULE. FIG. 16 shows a simple CASE used as part of routing policy. It states that "Block international calls". CASE can have an attribute NAME.

FIG. 17 shows a CASE with a schedule, it states that "Block international call during 8:00 AM and 18:00 PM". FIG. 18 shows a page with multiple CASEs. Notice that since the "checking process" is executed in linear order, the sequence of CASEs may be important. For example, if local toll-free calls are the most possible cases, by putting that case in the front can shorten the "checking process".

SCENARIO and INFO elements. SCENARIO lists a collection of snapshots on a call condition described by INFO element. Each INFO element describes a test condition that includes two parts: 1) a specific parameter of a call, defined by attribute "ELEMENT", 2) how the parameter should be checked, defined by attribute "LOOKUP". A parameter could be a destination number (destType), a carrier identification code (CIC), a calling party number (CPN), a personal identification number (PIN), an authorization code (AuthCode), and etc. See table 1 for pre-defined call parameters. A call parameter is checked against an object presented with an URL. In this following example,
    <info lookup="value://interLATACall" element="desType"/> the destination number is checked to see if the call is an inter-LATA call. In the following example,
    <info lookup="ldap://pindigits" element="pin"/>

PIN is verified. The verification is done through testing against the object "pindigits" in a directory server through LDAP interface.

Basically, there are three different types of checking:
  Check a call parameter against a specific value. The value could be a number such as "9014261600", or could be a pre-defined constant such as "intraLATACall", "internationalCall" and etc. See FIGS. 19 and 22 for examples. As a special case, the existence of a parameter can be also checked via omitting the value. See FIG. 20
  Check a call parameter against a database, such as LDAP-enabled directory, or a SQL database. See FIG. 21 for example.
  Check a call parameter by invoking a plug-in Servlet module. This allows to develop customized software for checking a call parameter, thus provides powerful extensibility to CPML.

The return of LOOKUP is either "TRUE" or "FALSE". The test result of INFO is "TRUE" when
  The return of LOOKUP is "TRUE" and the attribute unitLogic of INFO is not "Not", or
  The return of LOOKUP is "FALSE" and the attribute is "Not"
The result of INFO is "FALSE" when
  The return of LOOKUP is "TRUE" and the attribute unitLogic of INFO is "Not", or
  The return of LOOKUP is "FALSE" and the attribute is not "Not".
The return of SCENARIO is a production of each return of INFOs when the attribute "Logic" has value of "AND"; the return of SCENARIO is a sum of each return of INFOs when the Logic has value of "OR".

FIG. 22 shows a part of originating policy, which states that "any call to destinations with area code 901, 617, or office code 954-247 should be rejected".

SCHEDULE and PERIOD element. This element is used to define a time condition. It consists of a collection of time period defined by PERIOD element. PERIOD uses attribute "Start" and "End" to indicate the beginning and the end of a time period. Like INFO element, PERIOD can be associated with attribute unitLogic with value "not" for reversed logic. Like SCENARIO, SCHEDULE element can be associated with an attribute "logic" with value of "and" and "or". The return of testing SCHEDULE depends on the return of PERIODs as well as attributes unitLogic and Logic.

In the example shown in FIG. 23 is the same as shown in FIG. 22, except that the call restriction is limited to Saturday and Sunday. FIG. 24 demonstrates the power of negative logic. In this case, the call restriction is limited to Monday, Tuesday, Wednesday, Thursday, and Friday. Notice that without the reversed logic, the script will be much longer as shown in FIG. 25.

The basic time are presented as follows:
  The day of week is presented with abbreviations: Sun, Mon, Tue, Wed, Thu, Fri, and Sat
  The calendar data is presented in the format of mm/dd/yyyy, in which mm (01 to 12) represents the month, dd (01 to 31) represents the day, and yyyy represents the year
  The time of day is presented in hh:mm format. hh (00 to 23) represents the hour, and mm (00 to 59) represents the minute. A capital letter T must be used to separate the data and the time if the time of the day is applied.
  Listed below is valid PERIOD:
    <Period start="Mon" end="Fri"/>
    <period start="01/31/1999" end="10/31/1999"/>
    <period start="01/31/1999T05:00" end="02/28/1999T20:00"/>
    <period start="T05:00" end="T18:00"/>

The first one indicates Monday through Friday. The second one indicates Jan. 31, 1999 to Oct. 31, 1999. The third one indicates 5:000 AM on Jan. 31, 1999 to 8:00 PM on Oct. 31, 1999. The last one indicates 5:00 AM to 6:00 PM on everyday.

COLLECTION, ROUTE, REDIRCT, RELEASE and LINK elements. These elements describe the basic service actions. The attribute TARGET is an URL, which is used to describe the application software module that executing an action. In FIG. 19, the "route" action is executed by routing software module residing within the policy server. In FIG. 26, an external servlet is linked through the URL "http://www.MyHost.com/servel/MySpecialTask".

The COLLECT function is used to collect user information such as PIN, menu selection, authorization code, and etc. There are several attributes associated with this element to indicate the things like
  How many digits are to be collected
  What prompt is used pre-collection
  What prompt is used post-collection
In FIG. 27, the 12-digit PIN is collected through entity "sw1" with pre-prompt "annc3".

Figure 28A:
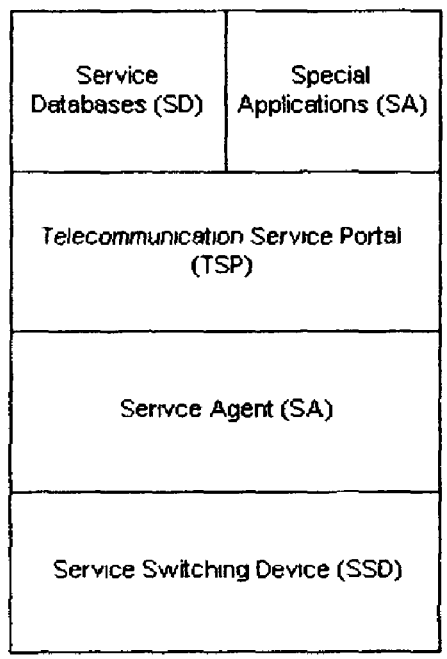
"
FIGS. 28a–28b illustrate the Enhanced Service Policy Architecture; and,
FIG. 29 is a block diagram illustrating operation of a system according to the invention utilizing the Enhanced Service Policy Architecture.

At the highest level, a voice service consists of a connection resource (a network for voice paths) and a service logic resource. A connection resource could be a Time Division Multiplex (TDM) based network, or an ATM based circuit network or an IP based network. ESPA defines a structure for the service logic resource that is compatible with any type of connection network. FIG. 28a shows a preferred implementation of ESPA. It is made up of the following major elements:
  1. A set of CPML-authored pages that represent the policy repository for the users of the ESPA-equipped network.

These pages can reside on a public IP network like the Internet, on a private IP network, or local to the remainder of the ESPA elements.

2. Service data that are not contained in CPML pages, such as database of telephone directory numbers, address, routing tables, connectivity of connection resource. These may also be stored on a remote network, or local to the telecommunication Service Portal. In one preferred implementation, standard interfaces such as LDAP and SQL are used for accessing these data.

3. A telecommunication Service Portal (TSP) which represents the gateway through which policies are acquired by the network nodes or switches. In one preferred implementation, a TSP contains directory servers, firewall (if pages are acquired from a public IP network), search engine, policy servers, and special-purpose application software.

4. A Service Agent (SA) which is capable to perform basic signaling control and call control functions, capable to communicate with TSP, and may also capable to perform SCP functions to communicates the a SSP enabled SSE. The SA may use a standard protocol like MGCP or IPDC to communicate with the Service Switching Device., or may provide a link to the SSD via the switch API, or may use IN or TCAP protocol to communicate with SSD.

A Service Switching Device (SSD) that provides the actual voice switching, DSP functions like voice compression, recognition, DTMF, MF tone detection and generation, call progress tone generation and detection, recorded announcement, n-party conference, and etc.

Figure 28B:
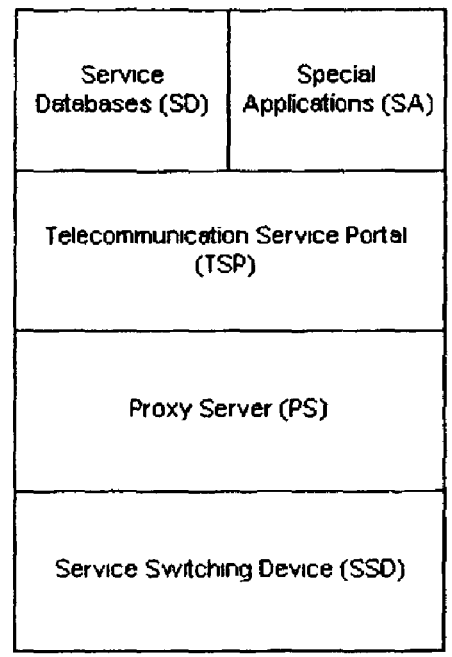

In another preferred implementation of ESPA as shown in FIG. 28b, a Proxy Server instead of Service Agent is implemented. In this configuration, the SSD has more intelligence than the SSD in FIG. 28a in the sense that it performs not only switching function and DSP functions but also signaling control and call control functions. In this configuration, standard protocol such as TCAP or IN, or a proprietary protocol or API may be used by the SSD, and the PS's main function is to link a SSD to TSP.

The ESPA adopts a client/server model. The SSD is a client to the SA and the SA is a server to the SSD. On the other hand, a SA or a PS functions as a client to the PS and the PS functions as the server to SA or PS. In ESPA, there could be multiple platforms for each function element. Most likely, one TSP can provide service to multiple SAs or PSs, one SA can be provide service to multiple SSDs.

Figure 29:
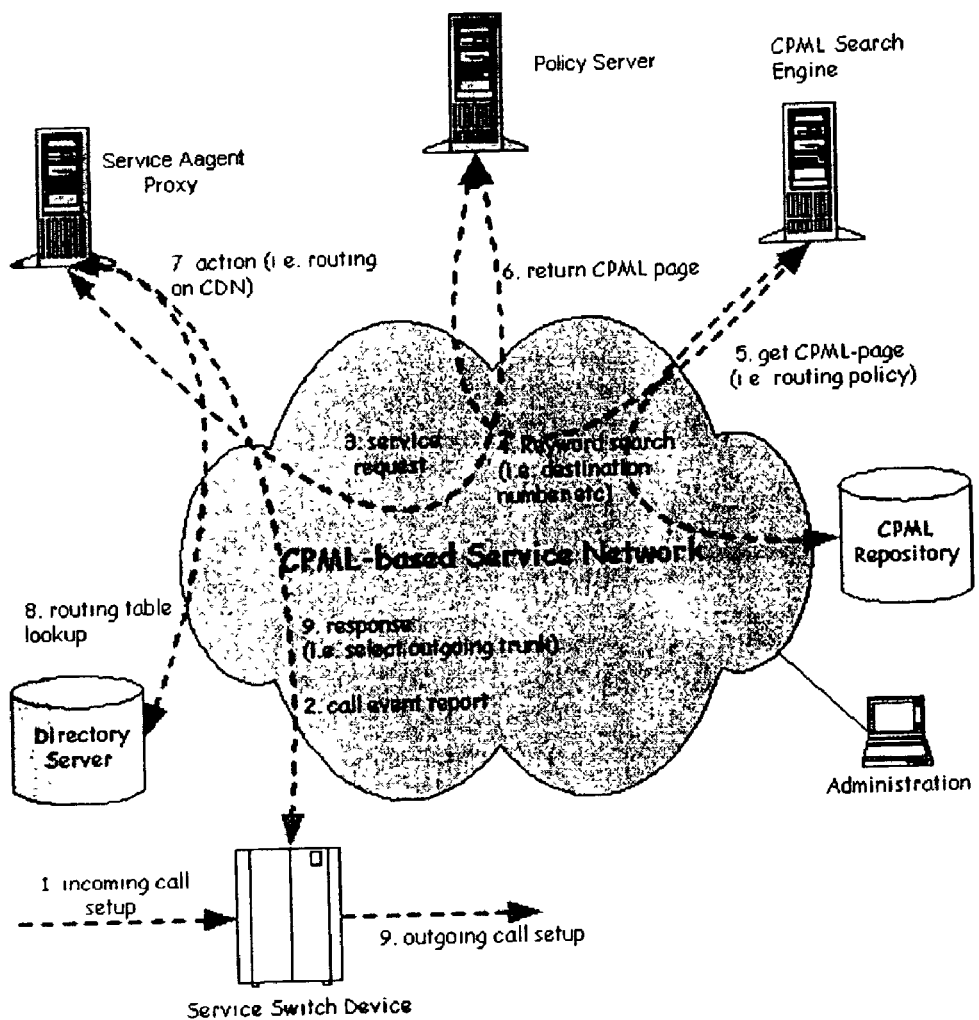

The SS7 and IP protocol are the preferred communication protocols used in ESPA. A SSD can be connected to SA through varieties of approaches. It could be TCP/IP based protocol such as MGCP and IPDC, it could be an API such as TAPI (Telephony API), S.100, SCAI, and etc. A SSD may also choose SS7 to communicate with SA. A SA is connected to PS of TSP through UDP of TCP/IP protocol. TSP is an IP network. Within it, the Policy Server is communicated with Search Engine (SE) through HTTP, communicated with Directory Server (DS) through Lightweight Data Access Protocol (LDAP), communicated with application modules through TCP/IP or COBRA, communicated with CPML repository servers with HTTP. The application software may choose any proper protocol to communicate with other modules or network elements. For example, the application software responsible for LNP translation can be implemented such that it uses TCP/IP to communicate to Policy Server and use SS7 TCAP to communicate to AIN (Advanced Intelligent Network). A SSD may also use TCAP or IN to communicate with Proxy Server. FIG. 29 shows the connectivity of the main elements in ESPA.

The ESPA adopts a client/server model. As a client, SSD and SA always initiates a request and response session with TSP. There are two types of request, one is request for initialization and another is request for call process.

The request of initialization results in the information download for signaling control and call handling. It includes data and control logic. In one preferred implementation, the original data, including basic line or trunk configurations, tables for digit analysis, signaling interface configurations, are stored in directory server and also CPML in TSP. When a facility of SSD (such as a line or a trunk group) is power up and after recovery, it sends a request to SA or PS for initialization information. The call control logic such as basic call model is also downloadable. A basic call model defines various stages of the life of a call. Typically, it may contain the following states:

"Null" Idle—there is no call activity

"Incoming Call Request"—a incoming call request is received

"Information collect"—call information is collected

"verification"—call information is analyzed and how the call should be handled is determined "call proceeding"—the call is either terminated to a line or routed to the next switch "alerting"—the called party is alerted "active"—the call between the calling party and the called party is established "release"—a call is released.

In each state a service request could be sent to TSP in order to support service features. For example, an in "verification", a request with call information could be sent to TSP to determine a "route" for the call. CPML page or other means can be used to describe the call model and "trigger" for sending request. By allowing SSD and SA to download configuration data and control logic, greatly enhanced'the programmability of telephone network.

Message Flow of Request for Call Process

A request for incoming call setup is initiated by SSD (when the SSD contains call control functions) or SA (when the call control functions is in SA) as shown in FIG. 29. The service request contains call information such as calling party number, called party number, line information, carrier information as well as facility information such as line or trunk ID, Trunk group ID and switch ID. The request is sent to TSP and is handled by a Policy Server.

In order to handle the request, the Policy Server needs to identify the proper policy page that contains the service logic to support the services the caller subscribed. The Policy Server takes the call information and converts them into key words and sends them to a CPML search engine through HTTP. The URLs of matched CPML pages are returned to Policy Server. The CPML pages are, therefore, retrieved from the web-server where they reside.

A Policy page associated with the facility or the caller is identified and parsed. The call condition is used to map the rules described by the policy, and a proper action (release, route, collect, redirect and etc) sent back to SA as a response.

The Basic Model—a Perspective from a Switch Device

Major events:

1. Incoming call set-up. An incoming call is a call incoming in from another switch, or a terminal (phone set and PBX for example) connected with this switch through a circuit (a DS0 trunk or a pair of copper wire). This Switch monitors circuits and response to call set-up request with proper action based-on signaling protocol.

The format of set-up request varies depending on the specific signaling protocol used. In in-band signaling case, a typical protocol is E&M wink-start, in which the proceeding switch signals an off-hook through so called robbed-bit signaling. In out-band signaling case, a typical protocol is SS7, in which an Initial Address Message (IAM) is sent to this switch.

This switch collects call information. Call information normally includes address information like called party number, caller's information like calling party number and redirecting party number, billing information like charge party number and ANI, call type like residential call and prison call etc, carrier selection information like carrier identification code and other. The among of information available varies depending on the signaling protocol. Normally, out-band signaling like SS7 and ISDN carries more call information than in-band signaling.

In out-band signaling, it may take one or multiple messages for the other end conveying the call information to the switch. In in-band signaling, it may take one or multiple sections of digit sequences. It is assumed that the knowledge of signaling used in the switch is pre-configured such that there is no need for switch to communicate with the service network.

The Switch sends query with information it collected to Call Policy Server through proxy, and then pause the call process. A response from Policy Server or an application server should be received within a short period of time—in one preferred implementation it should be within 200 ms. The response contains actions the Policy Server or an application server wants the switch to take. Possible actions are call routing, information collection, call termination, call redirection, call hold, call release and etc.

2. Call release. The Switch should continue monitoring the call in its entire life cycle for release signal. Release signal varies depending on the specific signaling protocol used. For example, in robbed-bit signaling "on-hook" signals a release request, and while in SS7 or ISDN signaling, a DISCONNECT (or RELEASE or RELEASE COMPLETE) message signals a call release request.

Switch detects release signal and as an option it may or may not report the event to Call Policy Server. If the switch is configured such that reporting release event is not required, it simply releases the call according to call process procedure. If the switch is configured such that reporting release is required, it should send a query with release information to Policy Server through proxy, and stop the call process and wait for response from Policy Server.

The response from Policy Server should contain a specific action the server wants to the switch to take. The possible actions are "release the call with recorded announcement", "release call with busy tone", "release call with message", "detect certain signal from calling party", and etc.

3. Detecting of an event at the middle of a call such as the expiration of a pre-determined timer, receiving a call progress tone of interesting, detecting a speech and etc. Monitoring this event is an option, which is decided by the Policy Server or application server involved in the call.

When such event occurs the switch should report the event to Policy server or the application server and continue monitoring the call. The PS or AS may or may not response to the event. When it responses it should contain action it wants the switch to take, including "call hold", "release call", "collect information", and etc.

Basic Call Process Functions

1 Call Routing. Call routing is a process in which the switch selects an idle circuit to place the call to the next switch. "Call routing" is one of the possible actions the PS may want the switch to take in response to the incoming call setup event. There are two levels of logic for circuit selection: 1) selecting a trunk group (a trunk group is a collection of circuit with same characteristics), 2) selecting a circuit within a given trunk group. In one preferred implementation, the logic for the later is pre-configured. That is, the PS does not provide any request in its response to the switch on this matter. There are different ways to select a trunk group. Based on the subscriber and network services involved, the PS should explicitly indicate to the switch how to select a trunk group as part of the response. The possible methods of selecting a trunk group in one preferred implementation are discussed as follows:

Route a call to a specific carrier. A typical situation to apply this method is when a call is an interLATA, intraLATA, or international call. A carrier can be indicated with either the carrier name (such as ATT for AT&T) or a 4-digit carrier identification code (such as 0288 for AT&T), and in its response the PS should use one of them. In one preferred implementation, the local database of a switch device keeps a table called "Carrier Routing Table". A carrier routing table uses carrier name and carrier identification code as index to locate the trunk group.

Route a call according to a Location Routing Number (LRN). A 10-digit LRN is used when the called party number is a portable number, a number that could be ported from the switch serving an area to another switch serving a different area. The LRN is used to indicate the switch in which the number currently resides. When a called party number is portable, LRN is obtained through a "translation" typically utilizing SS7 network by proceeding switch or by this switch. In one preferred implementation, a switch device keeps a table called "LRN Routing Table" in which LRN is used as index to locate the trunk group. Given a LRN and the LRN routing table, the trunk group that is configured for the call can be identified easily.

Route a call according to a called party number. Typically, this method is used when the call is a local call. A called party number could be 7-digit, 10-digit or any digits. In one preferred implementation, a switch device keeps a table called "Destination Routing Table" which uses telephone number as index to locate trunk group.

Routing a call to a selected trunk group. In this case, the PS decides which trunk group is to use for the call.

Route the call to a selected port. Similar to the previous case, except that instead of trunk group, a specific circuit is selected by the PS.

Call Termination.

Call termination is a call process used when the called party number belong to the switch, that is the called party a customer serving by the switch. In call termination, the switch uses the called party number to identify the port that connects to the customer's phone or terminal. The port in used could be in numerous status, such as "idle", "busy", "unequipped", "blocked", "in test" and etc. In one preferred implementation, the switch should react differently when the port is in different status. Here is a detail discussion.

"idle". When the port is idle, the switch should uses a pre-configured method to signal to the end user. Typical cases are 1) sending SETUP message if the terminal is ISDN terminal, 2) reversing battery to provide current to ring the customer's phone set, 3) sending a "off-hook" if the terminal is a PBX supporting E&M wink-start signaling. The logic for signaling control is pre-loaded in the switch, and there is no need for service network to involve. After the completion of call setup, switch cuts through the talking path and start monitoring the call as required.

a "busy". Redirect the call.

"unequipped". Recorded announcement. No SA interfere.

"blocked". Recorded announcement. No SA interfere.

"in test". Recorded announcement. No SA interfere.

Release Call.

A switch may receive "release call" request from PS or AS as a response to a "call setup" query, or a "call release" query; it may the request from an AS without the switch sending a query. The call release procedure should be invoked. Depending on the call type and the stage of the call, a release procedure may involve one party (the caller) or two-party (the caller and called party). When PS or AS requests call release, it should state explicitly whether to release the caller or the called party or both. The call release procedure varies depending on the signaling protocol used. In one preferred implementation, the logic of call release procedure is embedded in the signaling protocol stack, and there is no need for SA's further assistance.

Collecting User Information.

Possible user information includes:
 Identification Code—examples are Personal Identification Number (PIN), authorization code, account code, project code, security code, and etc.
 Address information—called party number (in calling card and debit card calling)
 Menu selection—for application like voice mail and call center User information is presented in DTMF (Dual Tone Multiple Frequency) digits format. The length of information may vary, and the PS or AS should specify the length of the digits or provide a timeout value for ending the digit collection procedure. Also as part of the request, a pre-collection prompt—used before collecting information, and a post-collection prompt—used after collecting information. The prompts may be a call progress tone like 350 Hz+440 Hz dial tone or a recorded announcement.

Collected User information should be reported to the PS or AS.

The Basic Model—a Perspective from Call Policy Server (CPS).

CPS is an entity in service network responsible for providing service to switch devices through taking request from switch and sending response back to switch. It connects to switch through proxy, connects search engine, policy repository, LDAP-based directory server and servlets through IP-based network. Its main functions include 1) accept service request from switch, 2) search a policy profile for the user, 3) identify and interpret the policy that is applicable to the call, 4) hand over the service request to a servlet, 5) send a response to the switch.

There are several important characteristics of PS. First, it works in a stateless fashion. That is, a PS does not contain a state machine for each call, and therefore it treats each request for the same call individually. There is no relation between one request from the others. There is no timer assigned within PS in processing the service request. It does not take responsibility for failing to response to the request from switches due to any error situation. It does not have the capability to identify missing request or miss-sequencing request. In one preferred implementation, the switch should keep a state machine of call control for each call (example of a state machine for SS7 ISUP signaling can be found in GR-246). The principle of stateless is critically important in order to achieve scalability in a centralized control environment.

Another important characteristic of PS is that it uses pattern-matching approach to identify the rule applicable to the call. It takes the call information it receives and uses them to check against the all the rules of a particular policy. A policy is defined through explicitly listing all the rules The network connectivity of PS:

To proxy

To search engine

To LDAP-based directory server

To policy repository

A detailed discussion of PS's functions follows:

Receiving query from switch device and sending response back to switch. A PS receives queries from switch through proxy. A query is a data packet in UDP format, and it consists of two parts: the head and the payload. The head contains general information regarding to the data packet, and is defined by the TCP/IP. The payload contains information in regarding to the call and used by both the switch and the PS. The content of payload is defined by this invention.

The payload of a query contains the following information: 1) facility ID, 2) the call reference, 3) the query ID, 4) query type, and 5) the call information.

The facility name is a character string. It services for two purposes. First, it is used for identifying the switch that sends the query message. In the response, the PS copies the facility name to make sure the response reaches to the sender switch. Second, the facility name is used when a PS to identify the policy profile that is designated to the switch facility. In preferred implementation, a facility name should contain information such as the switch name, the shelf name, and interface name, and etc. The facility name in a query message is always generated in the switch, and the PS processing the query bears no responsibility on the correctness of the name. A wrong facility name may cause either mismatching policy profile, or failure of identifying a policy profile, and PS is not responsible for either case.

The call reference is an integer used to identify uniquely a call related to a specific facility. This parameter is always generated in the switch. Call reference does not have impact on identifying a policy profile. In the response back to the switch, PS copies the call reference. Like facility name, it is the switch's responsibility to ensure the correctness of the call reference.

The query ID is an integer used to identify uniquely query message associated with a specific call. This is important because there could be more than one query involving the lifetime of a call. The switch uses this parameter to detect the missing query message or message missequencing. Like call reference, switch is the only user of query ID; in the response message, a PS copies the query ID from the original query message. It is the switch's responsibility to ensure the correctness of a query ID.

The query type indicates the purpose of the query. Therefore, it has a direct impact on identify the policy profile. In fact, a query type is used as one of the keyword for searching a policy profile. In preferred implementation, the following values of query type are defined as a basic set.

CallSetup—this is used when a switch receiving a incoming call setup request (receiving an IAM message for example), and the switch wants the service network to handle the call. A callsetup is related to a call setup policy that may consist of one or multiple policies. In the most simple situation, a call setup policy could contain just a routing policy; the more sophisticated design, a call setup policy could contain call originating, routing, translation, and terminating policy. Call setup policy can be designed per switch. In this case, the same policy can be shared by any call passed through the switch. Call setup policy can also be designed per trunk group, per caller, and etc.

CallOriginating—this is used when a switch receiving an incoming call setup request, and the switch wants to service network to check the call origination related policy for this call. A call originating policy covers services like authorization, authentication, call screening, call gapping, call destination restriction, call service denial, and etc. As needed, additional user information in DTMF format may be collected—like collecting authorization code. A call originating policy may be designed per switch, per trunk group, per port, or per caller.

Routing—this is used when a switch receiving an incoming call setup request, and the switch wants service network to provide routing information for this call. A routing policy defines the rule for selecting a carrier or a trunk group to which the call is handed over. A lot of services can be defined on routing. An example of customized routing policy is stated as follows. Using carrier A for calls to destination 9014261600; using carrier B for domestic long distance calls on Monday to Friday between 6:00 AM to 18:00 PM; using carrier C for domestic long distance calls on rest of the time; using carrier D for international calls.

Translation—this is used when a switch receiving an incoming call setup request, and the switch wants service network to provide information translation service. Typical translation includes 800/888 toll-free number translation
900 number translation
700 number translation
500 number translation
LNP translation
Calling party name translation
Destination address translation Terminating—

The payload of a response contains 1) facility name, 2) the call reference, 3) query ID, 4) action type, and 5) the details of action. The definition of facility name, call reference, and query ID are the same as those in the query message. The action type indicates the result of the query. In one preferred implementation, the possible values are RecordedAnnouncement—request the switch to connect the caller, or the called party or both to a specified recorded announcement. The may be the result of service denial, invalid authorization code, violating call restriction rules, unavailability of the called party, and etc.

CallProgressTone—request the switch to connect the caller, or the called party or both to a specified call progress tone such as busy tone, reorder tone, dial tone, and etc. This may be the result of service denial, invalid authorization code, violating call restriction rules, unavailability of the called party, and etc.

RelsCall—

Routing—request the switch to route the call to a specific trunk group, port, or a specific carrier. When trunk group is specified for routing, multiple trunk groups may be included as primary route and alternative routes. Trunk group's ID should be used. When a port is specified for routing, multiple ports may be included as primary route and alternative routes. The port ID should be used. When carrier is specified for routing, multiple carriers may be included. A mix of carrier and trunk group should be also option. Either carrier name or the carrier identification code should be included in the response. It is expected that the switch should be able to complete the route based on its local routing information. "Routing" is the result of executing routing policy.

CollectUserInfo—request the switch to collect DTMF user information. Unlike any other response, this response normally may not be the finally response to a query. For example, in handling a query from switch, additional information such as authorization code may be required per policy. The PS sends CollectUserInfo request to switch to collect information, and the switch should summit the query again for originating verification after collecting the information. The second query is the same as the first one except it with the additional information. A traverse on the originating policy tree may yield another CollectUserInfo, or "Accept", or "RelsCall".

Terminating—

Accept—

Error—error is used when a PS fails to execute the query. This may the result of many factors:

The information in query is insufficient to allocate a policy

The PS is malfunction—because of search engine, function failure of PS, loss of communication with other components, and etc.

Unrecognized information in query

Policy profile error

As a summary, the query and expected response in our preferred implementation are listed in the table.

|  | CallSetup | Originating | Routing | Translation | Terminating |
|---|---|---|---|---|---|
| Announcement | X | X | X |  | X |
| CPT | X | X | X |  | X |
| CollectInfo | X | X | X |  | X |
| Routing | X |  | X |  |  |
| Accept |  | X |  |  |  |
| RelsCall | X | X | X |  | X |
| Terminate | X |  |  |  | X |
| Acknowledge |  |  |  | X |  |
| Error | X | X | X | X | X |

1. Allocating policy page for the call. In one preferred implementation, the way that the PS identifies policy page is quite similar to use web-page search desired information on the internet. There are parts: the keywords used to best describe the desired information and the search engine.

The keywords used by a PS may come from the following information. The facility name, trunk group ID, the call information—such as calling party number, called party number, the ANI and line information, the query type—such as CallSetup, Originating, Routing, Terminating, and etc.

Correspondingly, in each valid policy page there should be a special "megatag" For a particular query of a particular, information available to search may not be complete. The "best effort" approach should be applied. For example, in processing CallSetup query, information like "calling party number" and "original line information" may not be available. In its "best effort" the PS should use "CallSetup" and the trunk group information It reformats information into key-words, search for policy page through web search engine (Ultraseek from Infoseek).

|  | CallSetup | Originating | Routing | Translation | Terminating |
| --- | --- | --- | --- | --- | --- |
| Query Type | X | X | X |  | X |
| CPN | X | X | X |  | X |
| CDPN | X | X | X |  | X |
| TG ID | X |  | X |  |  |
| OLI |  | X |  |  |  |
| CN | X | X | X |  | X |

1. Executing policy. XML-parser should go through the page and establish the parser-tree. CPS then will match the call event (calling party number, destination number etc) with the scenario, the time with schedule, and identify a proper action for switch to take.
2. Cache—improve efficiency
3. Multiple search result The Role of Search Engine The Examples of Subscribers Services Covered by Policies
1. Call originating policy
   Call service denial
   Call gapping
   Originating call screening
2. Routing policy
   Time dependent routing
   Location dependent routing
   Time and location dependent routing
   Time and location dependent carrier selection
   Originating dependent routing
3. Terminating policy
   Call screening
   Security screening
   Time dependent
   Call rejection
   Call redirecting (call forwarding)
4. Translation policy
   One number
5. Call record tracking
   Calling party name delivery It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A process for providing instructions to a telecommunications switch, said process comprising:
   (A) receiving from said switch a request for instructions for telecommunications services to be provided;
   (B) with a service agent, responding to said request, by performing steps comprising:
      (i) generating a query for transmission over an IP network for retrieving from a knowledge base information relating to the services to be provided by said switch in response to the request; and
      (ii) formulating instructions to said switch based on the results of said retrieval by converting to one or more switch instructions logic contained in information retrieved from the knowledge base, the switch instruction being used by said switch to respond to said request;
   (C) forwarding to said switch in real time the results of said formulation; and
   (D) indexing the location of said records in said knowledge base according to key words contained therein.

2. The process of claim 1 wherein said information relating to services to be provided is recorded in an extension of the eXtensible Markup Language.

3. The process of claim 1 in which said step (A) comprises the step of communicating with a proxy for said server.

4. The process of claim 1 in which step (C) comprises the step of communicating with a proxy for said server.

5. A process in setting up end-to-end communication in a switched telecommunication network, said process comprising:
   (A) receiving a request for set-up of a call between at least two parties on said network;
   (B) in response to said request, deploying a software agent to perform steps comprising:
      (i) retrieving from a knowledge base on an IP network at least one record containing information relating to allowed services for at least one of said parties; and
      (ii) formulating instructions to said switch for the set-up of said call based on the results of said retrieval; and
   (C) forwarding to said switch in real time the results of said formulation; and
   (D) indexing said knowledae base according to key words contained therein.

6. The process of claim 5 further comprising parallel off-line steps of
   (D) indexing the location of said records in said knowledge base according to key words contained therein.

7. The process of claim 5 wherein said information relating to services to be provided is recorded in an extension of the eXtensible Markup Language.

8. The process of claim 5 in which said step (A) comprises the step of communicating with a proxy for said switch.

9. The process of claim 5 in which said step (C) comprises the step of communicating with a proxy for said switch.

10. The process of claim 5 in which said step (B)(i) of retrieving is conducted over more than one node of a network.

11. An apparatus for setting up end-to-end communication in a switched telecommunication network, said apparatus comprising:
   (A) logic adapted to receive a request for set-up of a call between at least two parties on said network using a switch;
   (B) logic adapted to respond to said receipt by:
      (I) generating a query for transmission over an IP network for retrieving from a knowledge base information relating to services to be provided by said switch in response to said request; and
      (ii) formulating instructions to said switch based on the results of said retrieval by converting to one or more switch instructions logic contained in information retrieved from the knowledge base, the switch instructions being used by said switch to respond to said request; and (C) logic adapted to forward to said switch in real time the results of said formulation; and
(D) logic adapted to index the location of said records in said knowledge base according to key words contained therein.

12. A system for establishing communication on a telephone network, comprising
    a service switching element for receiving a request for telecommunications services,
    a service agent coupled to the service switching element that mediates signaling and interprets control as between the service switching element and a service portal by generating a query for transmission over an IP network for retrieving information relating to the request and formulating instructions based on the retrieval for the service switching element for fulfilling the request,
    a service portal that comprises one or more service logic elements, each defining call conditions and actions, wherein the call conditions and actions are indexed in a knowledge base according to key words contained therein.

13. A system according to claim 12, wherein a service logic element includes any of a markup language page, a databases, a configuration directory, and any other repository of information used in call processing.

14. A system according to claim 12, wherein the service switching element is any of a Class 4, a Class 5 switch, an ATM switch, a DSLAM, a RAS, a PBX, an IAD, and a Router.

15. The process of claim 1, wherein said retrieval comprises converting information in said request into one or more keywords for use with one or more search engines to locate the information in the knowledge base.

16. The process of claim 1, wherein to IP network is the World Wide Web.

* * * * *